United States Patent
Yamamoto et al.

(10) Patent No.: US 8,328,344 B2
(45) Date of Patent: Dec. 11, 2012

(54) AQUEOUS INK COMPOSITION FOR INKJET RECORDING AND IMAGE FORMING METHOD

(75) Inventors: Hiroshi Yamamoto, Kanagawa (JP); Keiichi Tateishi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 209 days.

(21) Appl. No.: 12/869,777

(22) Filed: Aug. 27, 2010

(65) Prior Publication Data

US 2011/0050784 A1 Mar. 3, 2011

(30) Foreign Application Priority Data

Sep. 1, 2009 (JP) .................. 2009-201866

(51) Int. Cl.
*G01D 11/00* (2006.01)
(52) U.S. Cl. .................. 347/100; 347/95; 106/31.13
(58) Field of Classification Search ............ 347/100, 347/95, 96, 101, 102; 106/31.27, 31.13, 106/31.6; 523/160, 161
See application file for complete search history.

(56) References Cited

U.S. PATENT DOCUMENTS

| | | | |
|---|---|---|---|
| 2008/0274283 A1* | 11/2008 | Tateishi et al. | 427/256 |
| 2010/0160504 A1* | 6/2010 | Morimoto et al. | 524/105 |
| 2010/0222472 A1* | 9/2010 | Morimoto | 524/105 |
| 2010/0240812 A1* | 9/2010 | Yamamoto | 524/105 |
| 2011/0166267 A1* | 7/2011 | Tateishi et al. | 524/100 |
| 2011/0300344 A1* | 12/2011 | Tateishi | 347/20 |

FOREIGN PATENT DOCUMENTS

JP 4174666 B 11/2008

* cited by examiner

Primary Examiner — Manish S Shah
(74) Attorney, Agent, or Firm — SOLARIS Intellectual Property Group, PLLC

(57) ABSTRACT

An aqueous ink composition for inkjet recording, including: a coloring material containing at least one selected from the group consisting of azo pigments represented by the following formula (1) and tautomers thereof, and salts and hydrates thereof; a dispersant; and a urethane-modified polyester resin (1)

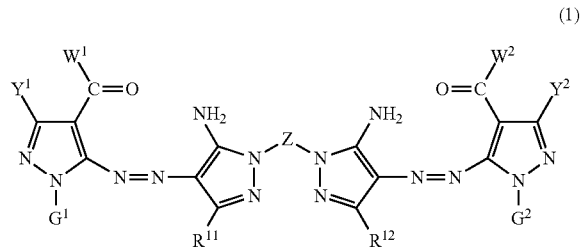

Figure 2:
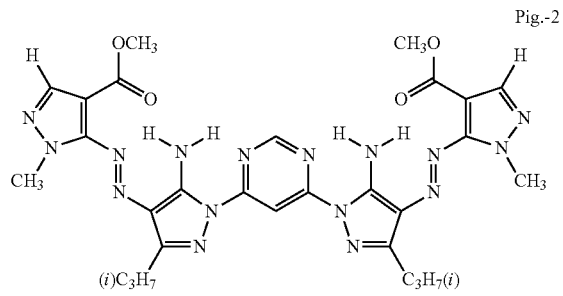
Figure 3:
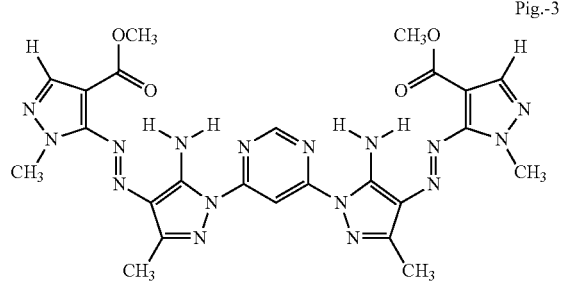
Figure 4:
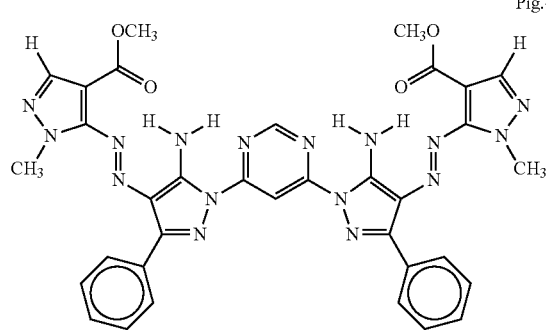
Figure 5:
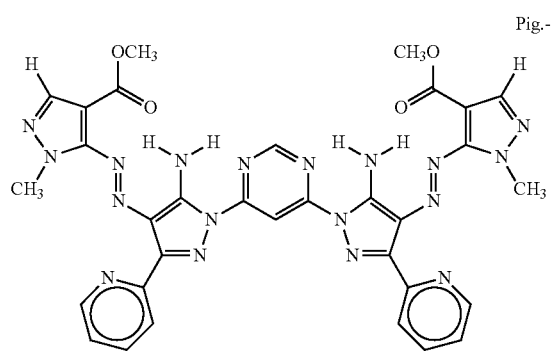
Figure 6:
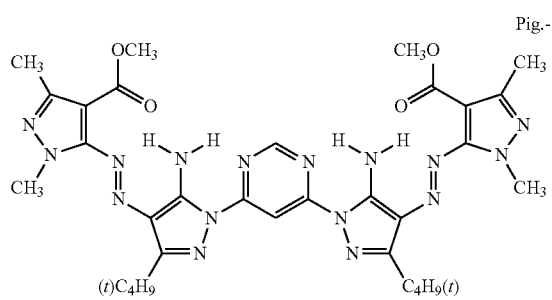
Figure 7:
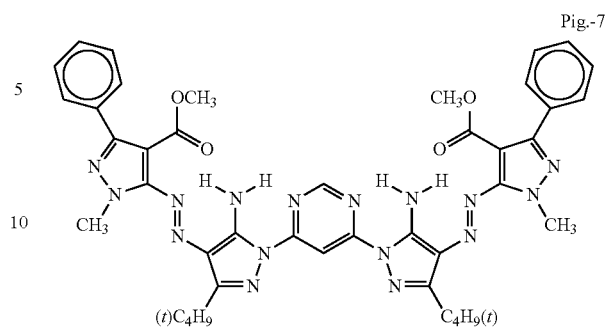
Figure 8:
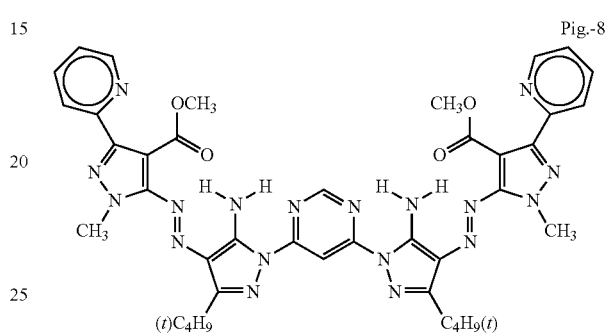
Figure 9:
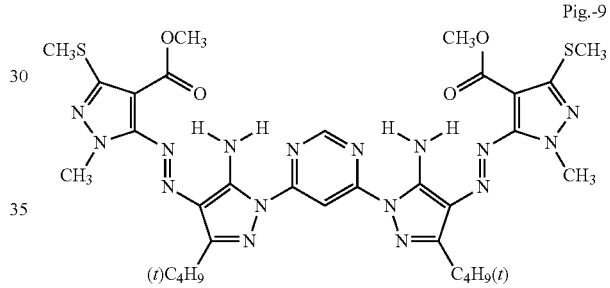
Figure 10:
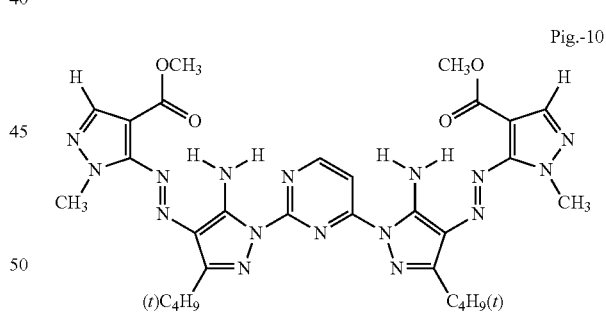
Figure 11:
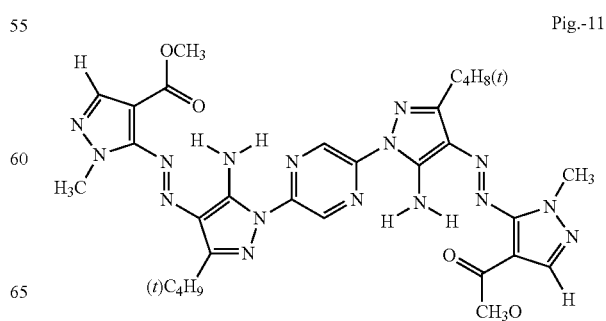
Figure 22:
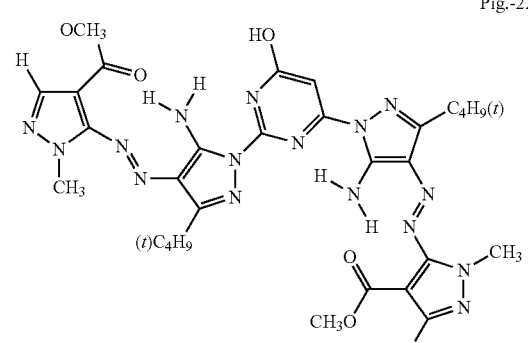
Figure 23:
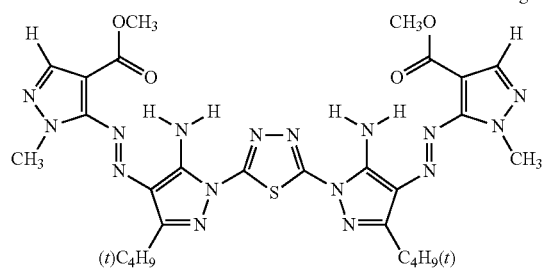
Figure 24:
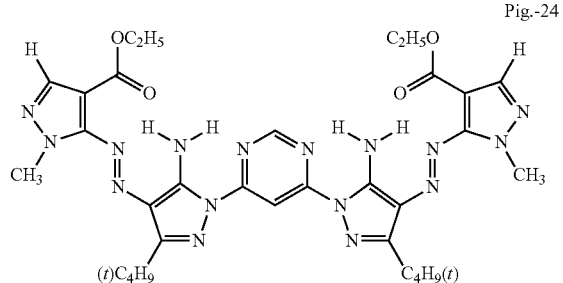
Figure 25:
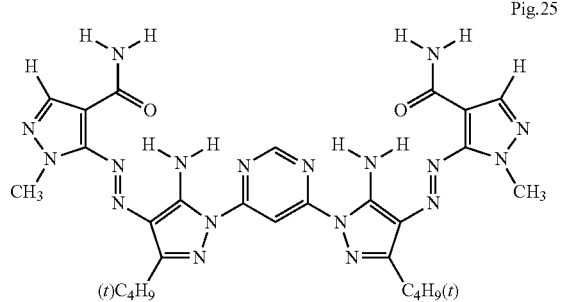
Figure 26:
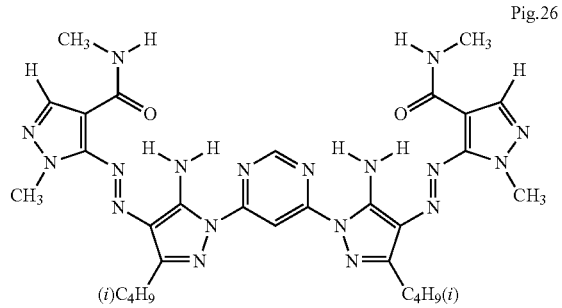
Figure 27:
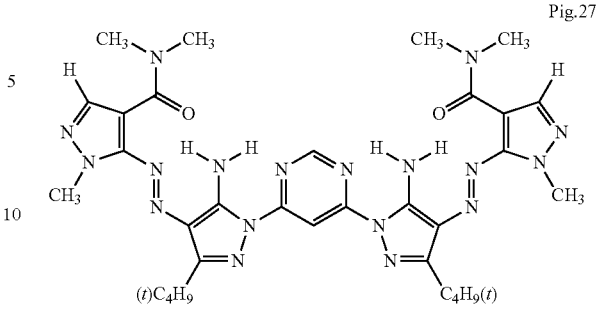
Figure 28:
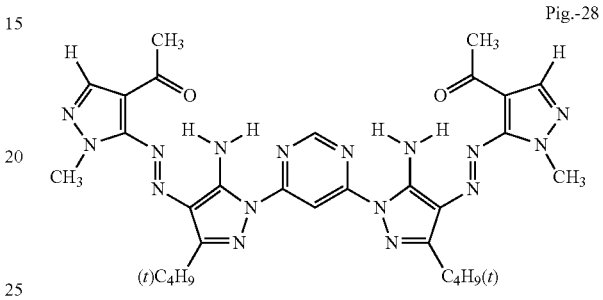
Figure 29:
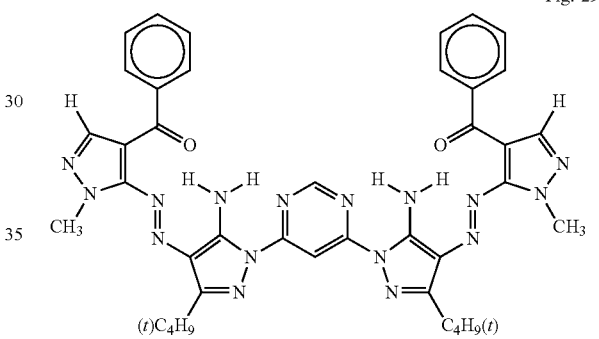
Figure 30:
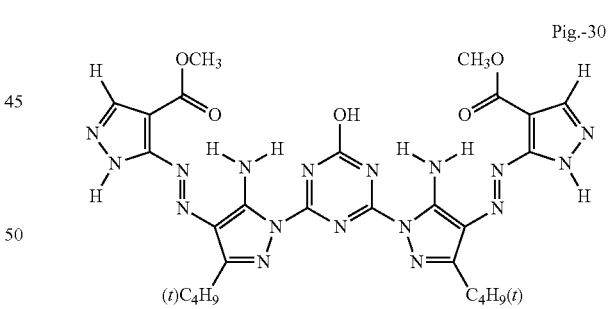
Figure 31:
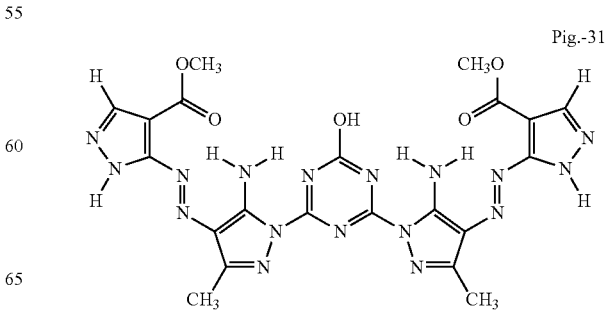
Figure 32:
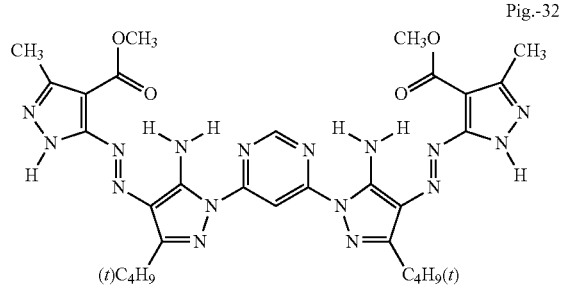
Figure 33:
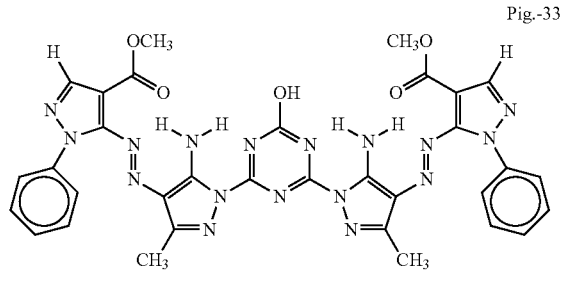
Figure 34:
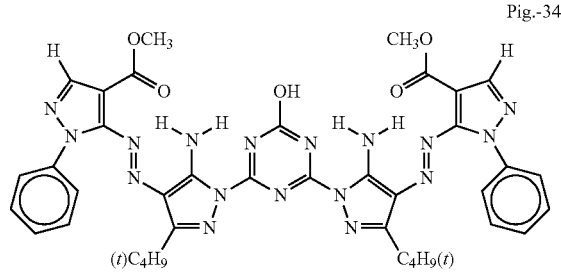
Figure 35:
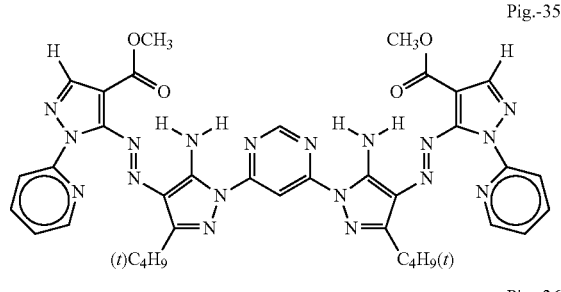
Figure 36:
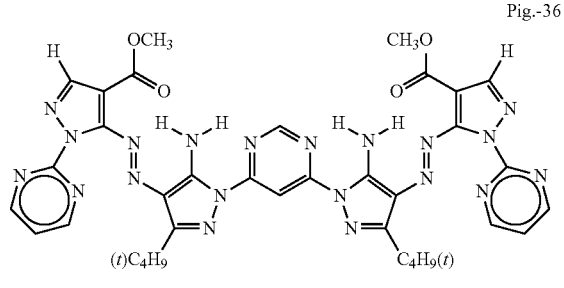
Figure 37:
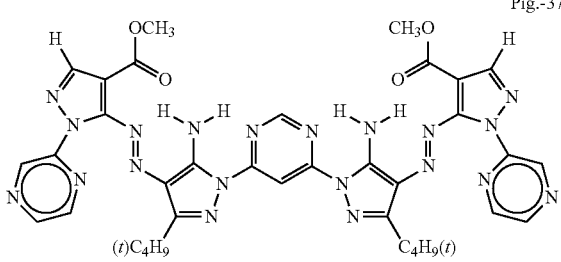
Figure 38:
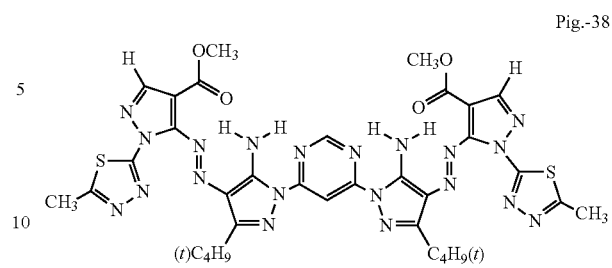
Figure 39:
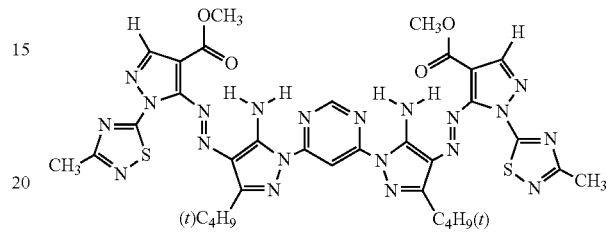
Figure 40:
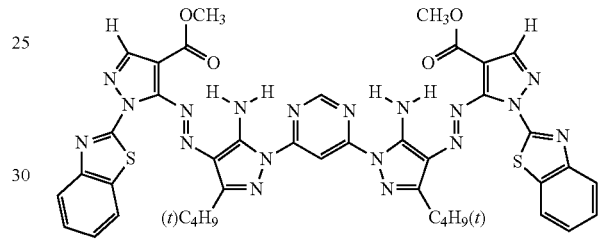
Figure 41:
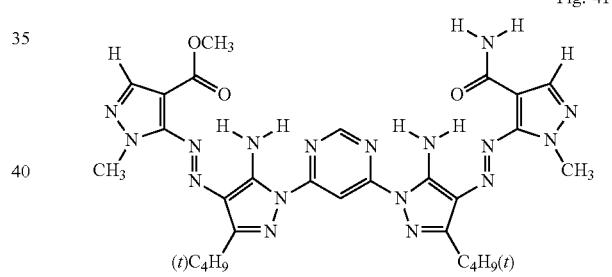
Figure 42:
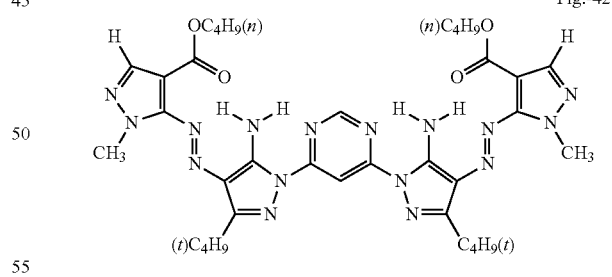
Figure 43:
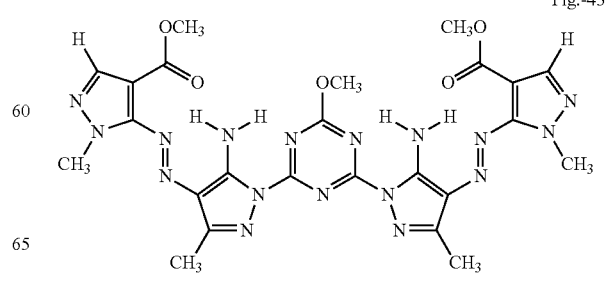

wherein Z represents a divalent group derived from a 5- to 8-membered nitrogen-containing heterocycle; $Y^1$, $Y^2$, $R^{11}$ and $R^{12}$ each independently represent a hydrogen atom or a substituent; $G^1$ and $G^2$ each independently represent a hydrogen atom, an alkyl group, an aralkyl group, an alkenyl group, an alkynyl group, an aryl group or a heterocyclic group; and $W^1$ and $W^2$ each independently represent an alkoxy group, an amino group, an alkyl group or an aryl group.

10 Claims, No Drawings

AQUEOUS INK COMPOSITION FOR INKJET RECORDING AND IMAGE FORMING METHOD

CROSS-REFERENCE TO RELATED APPLICATION

This application claims priority under 35 USC 119 from Japanese Patent Application No. 2009-201866 filed on Sep. 1, 2009, the disclosure of which is incorporated by reference herein.

BACKGROUND OF THE INVENTION

1. Field of the Invention

The present invention relates to an aqueous ink composition for inkjet recording and an image forming method.

2. Description of the Related Art

Pigment-based inks are available as inks for inkjet printers. Pigments are superior to dyes in light resistance and water resistance, and in recent years, pigments have been used as the colorants for ink compositions for inkjet printers, for the purpose of improving light resistance and water resistance. However, since pigments are generally insoluble in water, when a pigment is to be used in a water-based ink composition, it is necessary to mix the pigment with a dispersant such as a water-soluble resin and stably disperse the pigment in water prior to the preparation of the ink composition.

In order to stably disperse a pigment in a water-based system, it is needed to examine the type and the particle diameter of the pigment, the type of the resin used, the dispersing means and the like, and various dispersing methods and ink compositions for inkjet recording have been suggested thus far.

For example, there is disclosed an ink composition containing a polyester resin as an essential component, which has good storage stability of ink and excellent image glossiness (see, for example, Japanese Patent No. 417-4666).

However, the ink composition described in Japanese Patent No. 417-4666 does not have satisfactory jettability after long-term storage or high-temperature storage of the ink composition.

SUMMARY OF THE INVENTION

According to an aspect of the invention, there is provided an aqueous ink composition for inkjet recording, comprising: a coloring material containing at least one selected from the group consisting of azo pigments represented by the following formula (1) and tautomers thereof, and salts and hydrates thereof; a dispersant; and a urethane-modified polyester resin

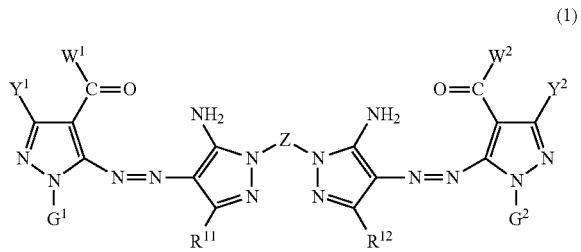

wherein Z represents a divalent group derived from a 5- to 8-membered nitrogen-containing heterocycle; $Y^1$, $Y^2$, $R^{11}$ and $R^{12}$ each independently represent a hydrogen atom or a substituent; $G^1$ and $G^2$ each independently represent a hydrogen atom, an alkyl group, an aralkyl group, an alkenyl group, an alkynyl group, an aryl group or a heterocyclic group; and $W^1$ and $W^2$ each independently represent an alkoxy group, an amino group, an alkyl group or an aryl group.

DETAILED DESCRIPTION OF THE INVENTION

<Aqueous Ink Composition for Inkjet Recording>

The aqueous ink composition for inkjet recording of the invention (hereinafter, may be simply referred to as "ink composition") includes a coloring material containing at least one selected from the group consisting of azo pigments represented by the following formula (1) and tautomers thereof, and salts and hydrates thereof, at least one dispersant, and at least one urethane-modified polyester resin, and optionally further includes other components.

By using an azo pigment having a specific structure and a urethane-modified polyester resin, an aqueous ink composition for inkjet recording, which has excellent jetting recoverability even after high-temperature storage and has satisfactory light resistance, can be prepared.

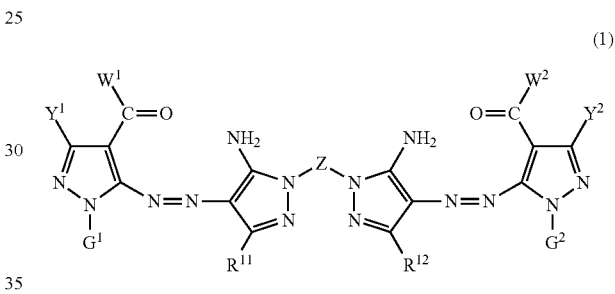

In the formula (1), Z represents a divalent group derived from a 5- to 8-membered nitrogen-containing heterocycle; $Y^1$, $Y^2$, $R^{11}$ and $R^{12}$ each independently represent a hydrogen atom or a substituent; $G^1$ and $G^2$ each independently represent a hydrogen atom, an alkyl group, an aralkyl group, an alkenyl group, an alkynyl group, an aryl group or a heterocyclic group; and $W^1$ and $W^2$ each independently represent an alkoxy group, an amino group, an alkyl group or an aryl group.

(Urethane-Modified Polyester Resin)

The urethane-modified polyester resin according to the invention is not particularly limited as long as it is a polyester resin including a structural unit containing a urethane bond. Among such resins, a water-soluble or water-dispersible urethane-modified polyester resin is preferred, and a water-soluble urethane-modified polyester resin is more preferred.

It is preferable that the urethane-modified polyester resin according to the invention include at least one structural unit derived from a hydroxyl group-containing polyester resin (polyester polyol) and at least one structural unit derived from an organic polyisocyanate.

According to the invention, the urethane-modified polyester resin can be constructed by reacting a hydroxyl group-containing polyester resin (polyester polyol) with a polyisocyanate compound, but if necessary, the urethane-modified polyester resin may further include a component having a hydrophilic group.

Furthermore, the hydroxyl group-containing polyester resin is a resin formed by an esterification reaction or trans-esterification reaction between at least one polybasic acid component and at least one polyhydric alcohol component.

Specific examples of the polybasic acid component include dibasic acids such as phthalic acid, isophthalic acid, terephthalic acid, tetrahydrophthalic acid, hexahydrophthalic acid, succinic acid, fumaric acid, adipic acid, sebacic acid and maleic acid; tri- or higher -valent polybasic acids such as trimellitic acid, methylcyclohexene tricarboxylic acid and pyromellitic acid; and acid anhydrides thereof, for example, phthalic anhydride, tetrahydrophthalic anhydride, hexahydrophthalic anhydride, maleic anhydride, trimellitic anhydride, pyromellitic anhydride; and the like.

As the polybasic acid component, one or more dibasic acids selected from the dibasic acids mentioned above, lower alkyl ester compounds of these acids, and acid anhydrides are mainly used. If necessary, a monobasic acid such as benzoic acid, crotonic acid or p-t-butylbenzoic acid; a tri- or higher-valent polybasic acid such as trimellitic anhydride, methylcyclohexene tricarboxylic acid or pyromellitic anhydride; or the like can be further used in combination with the polybasic acid component.

It is preferable that the polybasic acid component according to the invention include at least adipic acid, from the viewpoint of storage stability of the ink composition.

Specific examples of the polyhydric alcohol component include dihydric alcohols such as ethylene glycol, diethylene glycol, propylene glycol, dipropylene glycol, 1,4-butanediol, neopentyl glycol, 1,5-pentanediol, 3-methylpentanediol, 1,4-hexanediol and 1,6-hexanediol; and tri- or higher-valent polyhydric alcohols such as glycerin, trimethylolethane, trimethylolpropane and pentaerythritol.

For the polyhydric alcohol component, dihydric alcohols as mentioned above are mainly used, and if necessary, tri- or higher-valent polyhydric alcohols such as glycerin, trimethylolethane, trimethylolpropane and pentaerythritol can be further used in combination with the dihydric alcohols. These polyhydric alcohols can be used singly or as mixture of two or more kinds.

It is preferable that the polyhydric alcohol component according to the invention include at least 3-methylpentanediol, from the viewpoint of storage stability of the ink composition.

The esterification reaction or transesterification reaction of a polybasic acid component and a polyhydric alcohol component can be carried out using a conventionally used method without particular limitation.

Specific examples of the organic polyisocyanate compound that is reacted with the hydroxyl group-containing polyester resin (polyester polyol) include aliphatic diisocyanates such as lysine diisocyanate, hexamethylene diisocyanate and trimethylhexane diisocyanate; cyclic aliphatic diisocyanates such as hydrogenated xylene diisocyanate, isophorone diisocyanate, methylcyclohexane-2,4 (or 2,6)-diisocyanate, 4,4'-methylenebis(cyclohexyl isocyanate) and 1,3-(isocyanatomethyl)cyclohexane; aromatic diisocyanates such as tolylene diisocyanate, xylene diisocyanate and diphenylmethane diisocyanate; organic polyisocyanates themselves, including tri- or higher-valent polyisocyanates such as lysine triisocyanate; adducts each composed of such an organic polyisocyanate with a polyhydric alcohol, a low molecular weight polyester resin or hydrogen; and cyclized polymers (for example, isocyanurate), biuret type adducts and the like, each formed from various diisocyanate compounds mentioned above.

It is preferable, from the viewpoint of storage stability of the ink composition, that the organic polyisocyanate compound according to the invention include at least one selected from non-yellowing type polyisocyanate compounds such as isophorone diisocyanate, hexamethylene diisocyanate and lysine diisocyanate, and it is more preferable that the organic polyisocyanate compound include at least isophorone diisocyanate.

Furthermore, the organic polyisocyanate compounds can be used singly alone or as mixtures of two or more kinds.

In regard to the reaction conditions for the hydroxyl group-containing polyester resin (polyester polyol) and the organic polyisocyanate compound, those conventionally used reaction conditions can be used without particular limitation.

In the reaction between the hydroxyl group-containing polyester resin (polyester polyol) and the organic polyisocyanate compound, if necessary, the polyhydric alcohol or monoalcohol mentioned above may be further added to the reaction system.

The mass ratio of the hydroxyl group-containing polyester resin (polyester polyol) and the organic polyisocyanate compound in the urethane-modified polyester resin is not particularly limited, and can be appropriately selected in accordance with the ink composition.

Specific examples of the component having a hydrophilic group include dihydroxycarboxylic acid, dihydroxysulfonic acid, diaminocarboxylic acid, and the like.

The weight average molecular weight of the urethane-modified polyester resin according to the invention is not particularly limited, but can be adjusted, for example, in the range of 1,000 to 20,000. The acid value of the urethane-modified polyester resin can be adjusted, for example, in the range of 5 to 100 mg KOH/g, and preferably, the acid value is in the range of 10 to 60 mg KOH/g.

The urethane-modified polyester resin according to the invention is preferably such a resin which has been subjected to a thermal aging treatment, from the viewpoint of ink stability. The thermal aging treatment means a treatment of artificially inducing aging by treating the urethane-modified polyester resin obtained as described above, at a predetermined temperature for a predetermined time. Thereby, for example, the decrease in the ink viscosity caused by hydrolysis of the urethane-modified polyester resin can be suppressed.

The thermal aging treatment is preferably carried out such that the viscosity change ratio ($\Delta V$) of the urethane-modified polyester resin, as represented by the following formula (I), falls in the range of 6 to 15%, and more preferably in the range of 6 to 10%.

$$\Delta V(\%) = |V - V_0|/V_0 \times 100 \qquad (I)$$

In the formula (I), V represents the viscosity at 20° C. after the thermal aging treatment, and $V_0$ represents the viscosity at 20° C. before the thermal aging treatment. The viscosity is measured by a standard method using a commercially available viscometer, for example, a tube-type reverse flow viscometer.

The conditions for carrying out the thermal aging treatment to adjust the viscosity change ratio ($\Delta V$) within the range mentioned above may involve, for example, allowing an aqueous solution of the urethane-modified polyester resin to stand at a temperature of 60 to 70° C. for 3 to 6 days.

The ink composition of the invention contains the urethane-modified polyester resin as an essential component, and from the viewpoint of imparting satisfactory glossiness to the image formed by such an ink composition, the mass ratio of the urethane-modified polyester resin to the coloring material that will be described later (urethane-modified polyester resin/coloring material) is preferably 0.05 or greater, more preferably 0.05 to 0.8, and even more preferably 0.1 to 0.6.

(Coloring Material)

The aqueous ink composition for inkjet recording of the invention contains a coloring material containing at least one selected from the group consisting of azo pigments represented by the following formula (1) and tautomers thereof, and salts and hydrates thereof.

The azo pigment for constituting the coloring material used in the invention is representatively represented by the formula (1). Furthermore, the azo pigment may be a compound of the structure represented by the formula (1) or a tautomer thereof. Due to the use of the azo pigment having such a specific structure, an ink composition having excellent light resistance and jetting stability (particularly, jetting recoverability) can be prepared.

Hereinafter, the azo pigment represented by the following formula (1) will be explained.

The compound represented by the formula (1) can easily form an intermolecular interaction due to the specific structure of the compound, has low solubility in water or an organic solvent, and can be used as an azo pigment.

A pigment is different from a dye which is used after being dissolved in a molecularly dispersed state in water, an organic solvent or the like, and the pigment is used after being finely dispersed in a solvent as solid particles such as molecular aggregates.

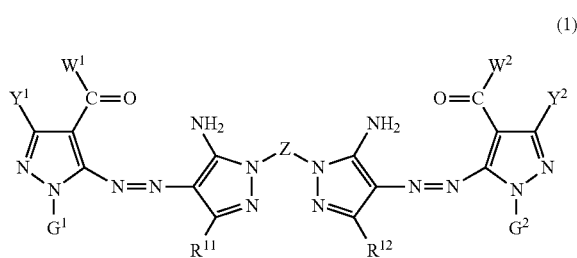

(1)

In the formula (1), Z represents a divalent group derived from a 5- to 8-membered nitrogen-containing heterocycle; $Y^1$, $Y^2$, $R^{11}$ and $R^{12}$ each independently represent a hydrogen atom or a substituent; $G^1$ and $G^2$ each independently represent a hydrogen atom, an alkyl group, a cycloalkyl group, an aralkyl group, an alkenyl group, an alkynyl group, an aryl group or a heterocyclic group; and $W^1$ and $W^2$ each independently represent an alkoxy group, an amino group, an alkyl group or an aryl group.

In the formula (1), Z represents a divalent group derived from a 5- to 8-membered nitrogen-containing heterocycle. Preferred examples of the nitrogen-containing heterocycle include (without limiting the substitution positions) a pyrrole ring, a pyrazole ring, a triazole ring, an imidazole ring, a thiazole ring, an isothiazole ring, an oxazole ring, an isoxazole ring, a thiadiazole ring, a thiophene ring, a furan ring, a pyridine ring, a pyrimidine ring, a triazine ring and a pyridazine ring. More preferably, the nitrogen-containing heterocycle is a 6-membered nitrogen-containing heterocycle, and examples thereof include a pyridine ring, a pyrimidine ring and an s-triazine ring. Particularly preferably, Z is a divalent group derived from a pyrimidine ring.

Z being a 6-membered nitrogen-containing heterocycle is preferable since the intramolecular and intermolecular actions of colorant molecules are more likely to be enhanced in terms of hydrogen bonding and the planarity of molecule.

Furthermore, the divalent group derived from a 5- to 8-membered nitrogen-containing heterocycle as represented by Z may be a condensed ring group.

In the case where $Y^1$ and $Y^2$ each represent a substituent, examples of the substituent include a halogen atom, an alkyl group (such as a linear, branched or cyclic, substituted or unsubstituted alkyl group, examples of which also include a cycloalkyl group, a bicycloalkyl group, a structure with more rings such as a tricyclo structure, and the like) (the alkyl group in the substituent that will be described later (for example, the alkyl group of an alkoxy group, an alkylcarbonyl group, an alkylsulfonyl group or the like) also represents an alkyl group belonging to such concept.), an aralkyl group, an alkenyl group, an alkynyl group, an aryl group, a heterocyclic group, a cyano group, a hydroxyl group, a nitro group, an alkoxy group, an aryloxy group, an silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or arylsulfonylamino group, a mercapto group, an alkylthio group, an arylthio group, a heterocyclic thio group, a sulfamoyl group, an alkyl- or arylsulfinyl group, an alkyl- or arylsulfonyl group, an acyl group, an aryloxycarbonyl group, an alkoxycarbonyl group, a carbamoyl group, an aryl- or heterocyclic azo group, an imide group, a phosphino group, a phosphinyl group, a phosphinyloxy group, a phosphinylamino group, and a silyl group.

$Y^1$ and $Y^2$ are each particularly preferably a hydrogen atom, an alkyl group (for example, a methyl group), an aryl group (for example, a phenyl group), a heterocyclic group (for example, a 2-pyridyl group), or an alkylthio group (for example, a methylthio group), and more preferably a hydrogen atom, a methyl group, a phenyl group or a methylthio group. Among them, a hydrogen atom is most preferred. $Y^1$ and $Y^2$ may be identical with or different from each other.

In the formula (1), $R^{11}$ and $R^{12}$ each represent a hydrogen atom or a substituent. In the case where $R^{11}$ and $R^{12}$ each represent a substituent, examples of the substituent include a linear or branched alkyl group having 1 to 12 carbon atoms (for example, methyl, ethyl, n-propyl, i-propyl, n-butyl, i-butyl, sec-butyl, t-butyl, 2-ethylhexyl, 2-methylsulfonylethyl, 3-phenoxypropyl, or trifluoromethyl), a linear or branched aralkyl group having 7 to 18 carbon atoms (for example, benzyl), a linear or branched alkenyl group having 2 to 12 carbon atoms (for example, vinyl), a linear or branched alkynyl group having 2 to 12 carbon atoms (for example, ethynyl), a linear or branched cycloalkyl group having 3 to 12 carbon atoms (for example, cyclopentyl), a linear or branched cycloalkenyl group having 3 to 12 carbon atoms (for example, cyclopentenyl), a halogen atom (for example, a chlorine atom or a bromine atom), an aryl group (for example, phenyl, 4-t-butylphenyl or 2,4-di-t-amylphenyl), a heterocyclic group (for example, imidazolyl, pyrazolyl, triazolyl, 2-furyl, 2-thienyl, 2-pyrimidinyl or 2-benzothiazolyl), a cyano group, a hydroxyl group, a nitro group, a carboxyl group, an amino group, an alkyloxy group (for example, methoxy, ethoxy, 2-methoxyethoxy or 2-methylsulfonylethoxy), an aryloxy group (for example, phenoxy, 2-methylphenoxy, 4-t-butylphenoxy, 3-nitrophenoxy, 3-t-butyloxycarbonylphenoxy or 3-methoxycarbonylphenyloxy), an acylamino group (for example, acetamide, benzamide or 4-(3-t-butyl-4-hydroxyphenoxy)butanamide), an alkylamino group (for example, methylamino, butylamino, diethylamino or methylbutylamino), an arylamino group (for example, phenylamino or 2-chloroanilino), a ureido group (for example, phenylureido, methylureido or N,N-dibutylureido), a sulfamoylamino group (for example, N,N-dipropylsulfamoylamino), an alkylthio group (for example, methylthio, octylthio or 2-phenoxyethylthio), an arylthio group (for example, phenylthio, 2-butoxy-5-t-octylphenylthio or 2-carboxyphenylthio), an alkyloxycarbonylamino group (for example, methoxycarbonylamino), an alkylsulfonylamino group and an arylsulfonylamino group (for example, methylsulfonylamino, phenylsulfonylamino or p-toluenesulfonylamino), a carbamoyl group (for example, N-ethylcarbamoyl or N,N-dibutylcarbamoyl), a sulfamoyl group (for example, N-ethylsulfamoyl, N,N-dipropylsulfamoyl or N-phenylsulfamoyl), a sulfonyl group (for example, methylsulfonyl, octylsulfonyl, phenylsulfonyl or p-toluenesulfonyl), an alkyloxycarbonyl group (for example, methoxycarbonyl or butyloxycarbonyl), a heterocyclic oxy group (for example, 1-phenyltetrazol-5-oxy or 2-tetrahydropyranyloxy), an azo group (for example, phenylazo, 4-methoxyphenylazo, 4-pivaloylamnophenylazo or 2-hydroxy-4-propanoylphenylazo), an acyloxy group (for example, acetoxy), a carbamoyloxy group (for example, N-methylcarbamoyloxy or N-phenylcarbamoyloxy), a silyloxy group (for example, trimethylsilyloxy or dibutylmethylsilyloxy), an aryloxycarbonylamino group (for example, phenoxycarbonylamino), an imide group (for example, N-succinimide or N-phthalimide), a heterocyclic thio group (for example, 2-benzothiazolylthio, 2,4-diphenoxy-1,3,5-triazole-6-thio or 2-pyridylthio), a sulfinyl group (for example, 3-phenoxypropylsulfinyl), a phosphonyl group (for example, phenoxyphosphonyl, octyloxyphosphonyl or phenylphosphonyl), an aryloxycarbonyl group (for example, phenoxycarbonyl), an acyl group (for example, acetyl, 3-phenylpropanoyl or benzoyl), and an ionic hydrophilic group (for example, a carboxyl group, a sulfo group, a phosphono group or a quaternary ammonium group).

In the formula (1), preferred examples of $R^{11}$ and $R^{12}$ include a substituted or unsubstituted acylamino group having 1 to 8 carbon atoms in total, a substituted or unsubstituted alkyl group having 1 to 12 carbon atoms in total, a substituted or unsubstituted aryl group having 6 to 18 carbon atoms in total, or a substituted or unsubstituted heterocyclic group having 4 to 12 carbon atoms in total. $R^{11}$ and $R^{12}$ are each more preferably a linear alkyl group or branched alkyl group having 1 to 8 carbon atoms in total, and more preferably a methyl group or a t-butyl group. Among them, in particular, a t-butyl group is most preferable.

When a linear alkyl group or branched alkyl group having fewer carbon atoms in total (for example, having 1 to 4 carbon atoms) is selected for $R^{11}$ and $R^{12}$, more excellent color, coloring properties, and image fastness can be achieved.

Furthermore, $R^{11}$ and $R^{12}$ may be identical with or different from each other.

$G^1$ and $G^2$ each represent a hydrogen atom, an alkyl group, a cycloalkyl group, an aralkyl group, an alkenyl group, an alkynyl group, an aryl group or a heterocyclic group, and particularly preferably, $G^1$ and $G^2$ are each preferably a hydrogen atom, a methyl group, an ethyl group, an n-propyl group, an i-propyl group, a t-butyl group, a cyclopropyl group, a benzyl group, a 2-phenethyl group, a vinyl group, an allyl group, an ethynyl group, a propargyl group, a phenyl group, a p-tolyl group, a naphthyl group, a pyridyl group, a pyrimidinyl group, or a pyrazinyl group, and more preferably a hydrogen atom, a methyl group, a phenyl group, a pyridyl group, a pyrimidinyl group or a pyrazinyl group. Among them, a methyl group, a 2-pyridyl group, a 2,6-pyrimidinyl group and a 2,5-pyrazinyl group are preferred.

Furthermore, in the case where $G^1$ and $G^2$ each represent an alkyl group, $G^1$ and $G^2$ are each preferably an alkyl group having 5 or fewer carbon atoms in total, more preferably an alkyl group having 3 or fewer carbon atoms in total, and most preferably a methyl group. $G^1$ and $G^2$ may be identical with or different from each other.

In the formula (1), $W^1$ and $W^2$ each represent an alkoxy group, an amino group, an alkyl group, or an aryl group.

The alkoxy groups represented by $W^1$ and $W^2$ are each preferably a substituted or unsubstituted alkoxy group having 1 to 30 carbon atoms, and particularly preferably a substituted or unsubstituted alkoxy group having 1 to 5 carbon atoms. Examples thereof include a methoxy group, an ethoxy group, an i-propoxy group, a t-butoxy group, an n-octyloxy group, a 2-methoxyethoxy group, and the like.

Examples of the amino groups represented by $W^1$ and $W^2$ include an alkylamino group, an arylamino group and a heterocyclic amino group, and the amino group is preferably an amino group, a substituted or unsubstituted alkylamino group having 1 to 30 carbon atoms, or a substituted or unsubstituted anilino group having 6 to 30 carbon atoms. Among them, an amino group, a substituted or unsubstituted alkylamino group having 1 to 8 carbon atoms, and a substituted or unsubstituted anilino group having 6 to 18 carbon atoms are preferred, and an amino group, a substituted or unsubstituted alkylamino group having 1 to 4 carbon atoms, and a substituted or unsubstituted anilino group having 6 to 12 carbon atoms are more preferred. Examples thereof include an amino group ($—NH_2$), a methylamino group ($—NHCH_3$), a dimethylamino group $\{—N(CH_3)_2\}$, an anilino group ($—NHPh$), an N-methylanilino group $\{—N(CH_3)Ph\}$, a diphenylamino group $\{—N(Ph)_2\}$ and the like.

The alkyl groups represented by $W^1$ and $W^2$ may be each independently a linear, branched or cyclic substituted or unsubstituted alkyl group, examples of which also include a cycloalkyl group, a bicycloalkyl group, a structure having more rings such as a tricyclo structure, and the like.

Specifically, the alkyl group is preferably an alkyl group having 1 to 30 carbon atoms, and examples include a methyl group, an ethyl group, an n-propyl group, an i-propyl group, a t-butyl group, an n-octyl group, an eicosyl group, a 2-chloroethyl group, a 2-cyanoethyl group, a 2-ethylhexyl group, and the like. The cycloalkyl group is preferably a substituted or unsubstituted cycloalkyl group having 3 to 30 carbon atoms, and examples include a cyclohexyl group, a cyclopentyl group, a 4-n-dodecylcyclohexyl group, and the like. The bicycloalkyl group is preferably a substituted or unsubstituted bicycloalkyl group having 5 to 30 carbon atoms, that is, a monovalent group formed by removing one hydrogen atom from a bicycloalkane having 5 to 30 carbon atoms, and examples include a bicyclo[1.2.2]heptan-2-yl group, a bicyclo[2.2.2]octan-3-yl group, and the like.

The aryl groups represented by $W^1$ and $W^2$ are each preferably a substituted or unsubstituted aryl group having 6 to 30 carbon atoms, and among others, a substituted or unsubstituted aryl group having 6 to 18 carbon atoms is preferred, and a substituted or unsubstituted aryl group having 6 to 12 carbon atoms is more preferred. Examples thereof include a phenyl group, a p-tolyl group, a naphthyl group, an m-chlorophenyl group, an o-hexadecanoylaminophenyl group, and the like.

Among them, preferred examples of $W^1$ and $W^2$ include an alkoxy group (for example, a methoxy group, an ethoxy group, an i-propoxy group or a t-butoxy group), an amino group (for example, a $—NH_2$ group, a methylamino group, a dimethylamino group or an anilino group), an alkyl group (for example, a methyl group, an ethyl group, an n-propyl group, an i-propyl group, a t-butyl group, or a cyclopropyl group), or an aryl group (for example, a phenyl group, a p-tolyl group, or a naphthyl group). Among others, an alkoxy group, an amino group, a phenyl group or an alkyl group is preferred, and an alkoxy group and an amino group are more preferred.

More preferably, when $W^1$ and $W^2$ are each an alkoxy group having 5 or fewer carbon atoms in total, an amino group (—$NH_2$ group), or an alkylamino group having 5 or fewer carbon atoms in total, it becomes easy for colorant molecules to form strong hydrogen bonding intramolecularly and/or intermolecularly, and it is preferable from the viewpoints of satisfactory color and high fastness (for example, light-resistant, gas-resistant, heat-resistant, water-resistant, chemical-resistant, and the like).

Particularly preferred substituents in view of color phase, light fastness and solvent resistance are an alkoxy group having 3 or fewer carbon atoms in total, an amino group (—$NH_2$ group), and an alkylamino group having 3 or fewer carbon atoms in total, and among them, in particular, a methoxy group (—$OCH_3$ group) or an ethoxy group (—$OC_2H_5$ group) is particularly preferred. A methoxy group is particularly preferred from the viewpoint of satisfactory color and enhancement of light fastness.

$W^1$ and $W^2$ may be identical with or different from each other.

According to the invention, if $Z, Y^1, Y^2, R^{11}, R^{12}, G^1, G^2, W^1$ and $W^2$ are further substituted with substituents, these substituents may include the following.

Examples of such substituents include a halogen atom, an alkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or arylsulfonylamino group, a mercapto group, an alkylthio group, an arylthio group, a heterocyclic thio group, a sulfamoyl group, an alkyl- or arylsulfinyl group, an alkyl- or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, and a silyl group.

The azo pigment according to the invention also includes a tautomer of the azo pigment represented by the formula (1) in the scope of the pigment. Although the formula (1) is shown in the form of a canonical formula among various kinds of tautomers that can be adopted for the chemical structure, a tautomer having a structure other than the described structure may also be used, and a mixture of plural tautomers may also be used.

For example, a tautomer of azo-hydrazone represented by the following formula (1') can be conceived for the azo pigment represented by the formula (1).

The invention also includes the compound represented by the following formula (1'), which is a tautomer of the azo pigment represented by the formula (1), in the scope of the pigment.

In the formula (1'), $R^{11}, R^{12}, W^1, W^2, Y^1, Y^2, G^1, G^2$ and Z have the same definitions as $R^{11}, R^{12}, W^1, W^2, Y^1, Y^2, G^1, G^2$ and Z in the formula (1), respectively.

Furthermore, in regard to the combination of preferred substituents of the compound represented by the formula (1), a compound in which at least one of various substituents is a preferred group mentioned above is preferable, and a compound in which more of the various substituents are preferred groups mentioned above is more preferable, and a compound in which all of the substituents are preferred groups described above is most preferable.

A particularly preferred combination in the azo pigment represented by the formula (1) of the invention includes at least one of the following items (a) to (e).

(a) It is preferable that $W^1$ and $W^2$ be each independently an alkoxy group (for example, a methoxy group, an ethoxy group, an i-propoxy group or a t-butoxy group), an amino group (for example, a —$NH_2$ group, a methylamino group, a dimethylamino group or an anilino group), an alkyl group (for example, a methyl group, an ethyl group, an n-propyl group, an i-propyl group, a t-butyl group or a cyclopropyl group) or an aryl group (for example, a phenyl group, a p-tolyl group or a naphthyl group). Among them, an alkoxy group, an amino group and an alkyl group are preferred, and an alkoxy group and an amino group are more preferred. $W^1$ and $W^2$ are each still more preferably an alkoxy group having 5 or fewer carbon atoms in total, an amino group (—$NH_2$ group), or an alkylamino group having 5 or fewer carbon atoms in total, and particularly preferably an alkoxy group having 3 or fewer carbon atoms in total, an amino group (—$NH_2$ group), or an alkylamino group having 3 or fewer carbon atoms in total. Among them, in particular, a methoxy group (—$OCH_3$ group) is most preferred.

(b) It is preferable that $R^{11}$ and $R^{12}$ be each independently a hydrogen atom, or a substituent (for example, a substituted or unsubstituted acylamino group having 1 to 8 carbon atoms in total, a substituted or unsubstituted alkyl group having 1 to 12 carbon atoms in total, a substituted or unsubstituted aryl group having 6 to 18 carbon atoms in total, or a substituted or unsubstituted heterocyclic group having 4 to 12 carbon atoms in total). A linear alkyl group or branched alkyl group having 1 to 8 carbon atoms in total is more preferred, and a methyl group, an i-propyl group and a tert-butyl group are more preferred. Among them, in particular, a tert-butyl group is most preferred.

(c) Z represents a divalent group derived from a 5- to 8-membered nitrogen-containing heterocycle which may be a condensed ring. The nitrogen-containing heterocycle for Z is preferably a 5- or 6-membered, substituted or unsubstituted, nitrogen-containing heterocycle, such as a pyrrole ring, a pyrazole ring, a triazole ring, an imidazole ring, a thiazole ring, an isothiazole ring, an oxazole ring, an isoxazole ring, a thiadiazole ring, a thiophene ring, a furan ring, a pyridine ring, a pyrimidine ring, a triazine ring, or a pyridazine ring, and particularly preferably a 6-membered nitrogen-contain-

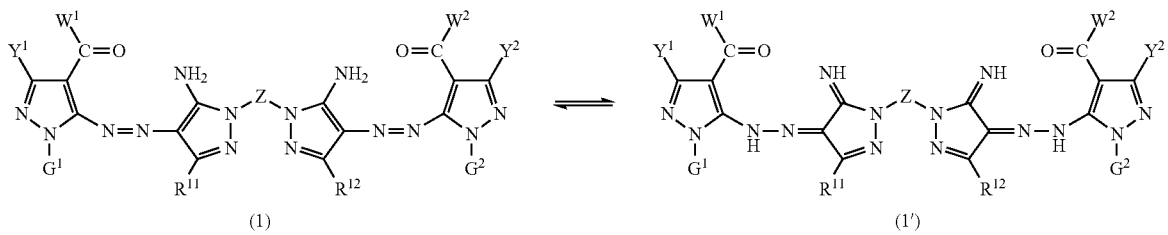

ing heterocycle having 3 to 10 carbon atoms. More preferred examples of the heterocycle include a pyridine ring, a pyrimidine ring, an s-triazine ring, a pyridazine ring and a pyrazine ring; more preferred examples include a pyridine ring, a pyrimidine ring, an s-triazine ring, a pyridazine ring and a pyrazine ring; and even more preferred examples include a pyrimidine ring and an s-triazine ring. Among them, in particular, a pyrimidine ring is most preferred.

(d) $G^1$ and $G^2$ each independently represent a hydrogen atom, an alkyl group, a cycloalkyl group, an aralkyl group, an alkenyl group, an alkynyl group, an aryl group or a heterocyclic group. Particularly preferably, a hydrogen atom, a methyl group, an ethyl group, an n-propyl group, an i-propyl group, a t-butyl group, a cyclopropyl group, a benzyl group, a 2-phenethyl group, a vinyl group, an allyl group, an ethynyl group, a propargyl group, a phenyl group, a p-tolyl group, a naphthyl group, a pyridyl group, a pyrimidinyl group and a pyrazinyl group are preferred, and a hydrogen atom, a methyl group, a phenyl group, a pyridyl group, a pyrimidinyl group and a pyrazinyl group are more preferred. Among them, a methyl group, a 2-pyridyl group, a 2,6-pyrimidinyl group and a 2,5-pyrazinyl group are preferred.

The alkyl groups represented by $G^1$ and $G^2$ are each more preferably an alkyl group having 5 or fewer carbon atoms in total, more preferably an alkyl group having 3 or fewer carbon atoms in total, and most preferably a methyl group.

(e) $Y^1$ and $Y^2$ each independently represent a hydrogen atom, an alkyl group (for example, a methyl group), an aryl group (for example, a phenyl group), a heterocyclic group (for example, a 2-pyridyl group), or an alkylthio group (for example, a methylthio group), and are each preferably a hydrogen atom, a methyl group, a phenyl group or a methylthio group. Among them, a hydrogen atom is particularly preferred.

Among the azo pigment compounds represented by the formula (1) according to the invention, an azo pigment represented by the following formula (2) is preferred.

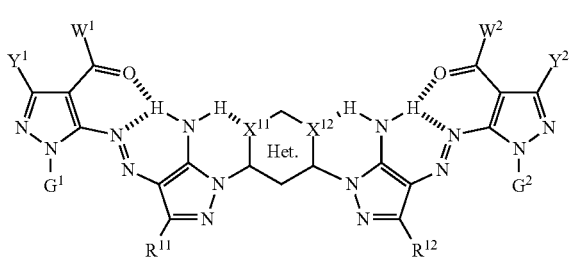

(2)

$G^1$, $G^2$, $R^{11}$, $R^{12}$, $W^1$, $W^2$, $Y^1$ and $Y^2$ in the formula (2) have the same definitions as $G^1$, $G^2$, $R^{11}$, $R^{12}$, $W^1$, $W^2$, $Y^1$ and $Y^2$ in the formula (1), respectively. $X^{11}$ and $X^{12}$ each independently represent a heteroatom in the divalent group (Het.) derived from the nitrogen-containing heterocycle represented by Z in the formula (1).

According to the invention, a number of tautomers may be conceived for the azo pigment represented by the formula (1).

Furthermore, according to the invention, it is preferable that the azo pigment represented by the formula (1) have substituents which form intramolecular hydrogen bonding or intramolecular cross-linking hydrogen bonding. The azo pigment represented by the formula (1) according to the invention preferably has substituents which form at least one or more intramolecular cross-linking hydrogen bonds, and more preferably has substituents which form at least three or more intramolecular hydrogen bonds. It is particularly preferable when the azo pigment has substituents which form at least three or more intramolecular hydrogen bonds, wherein at least two of such hydrogen bonds form intramolecular cross-linking hydrogen bonds.

Among the azo pigments represented by the formula (1), an example of a particularly preferable formula of azo pigment as previously described may be the azo pigment represented by the formula (2).

One reason for considering this structure preferable is that, as shown in the formula (2), the nitrogen atoms included in the heterocycle, the hydrogen atoms, and the heteroatoms (the nitrogen atoms of the azo groups or tautomers thereof (hydrazone groups), the oxygen atoms of the carbonyl groups or the nitrogen atoms of the amino groups) included in the azo pigment structure can easily form at least one or more intramolecular cross-linking hydrogen bonds (intramolecular hydrogen bonds).

One reason for considering these structures preferable is that, as shown in the formula (2), the nitrogen atoms included in the heterocyclic group, the hydrogen atoms of the amino groups, and the heteroatoms (for example, the nitrogen atoms of the azo groups or tautomers thereof (hydrazone groups), the oxygen atoms of the carbonyl groups or the nitrogen atoms of the amino groups) included in the azo pigment can easily form at least four or more intramolecular hydrogen bonds, and can easily form at least two or more intramolecular cross-linking hydrogen bonds.

As a result, the planarity of the molecule is increased, the intramolecular and intermolecular interactions are further enhanced, and the crystallinity of, for example, the azo pigment represented by the formula (2) is increased (easily forming a higher order structure). As a result, light fastness, thermal stability, moisture thermal stability, water resistance, gas resistance and/or solvent resistance, which are performances required for pigments, are enhanced to large extents. Therefore, the azo pigment serves as the most preferable example.

Furthermore, the azo pigment according to the invention may also contain an isotope (for example, $^2H$, $^3H$, $^{13}C$ or $^{15}N$) in the compound represented by the formula (1).

Specific examples of the azo pigment represented by the formula (1) will be presented below as Pig.-1 to Pig.-48; however, the azo pigment used in the invention is not to be limited to the following examples. Although the structures of the following specific examples are shown in the form of a canonical structure among various kinds of tautomers that can be adopted for the chemical structure, it is needless to say that tautomeric structures other than the structures described below may also be used.

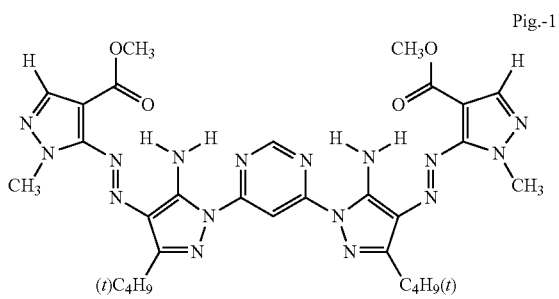

Pig.-1

-continued
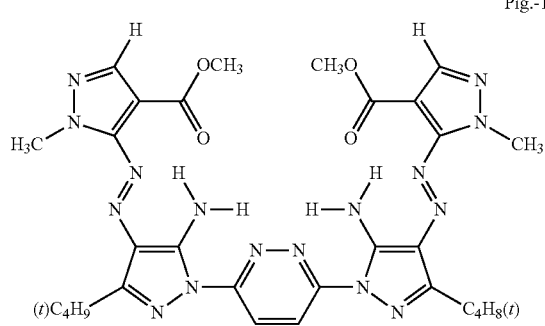
Pig.-12
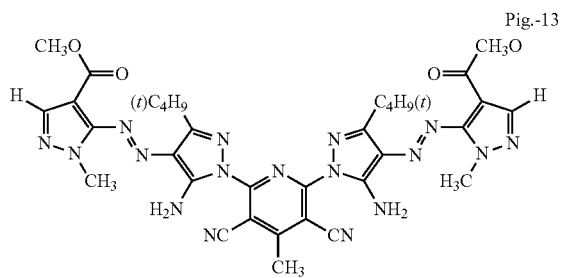
Pig.-13
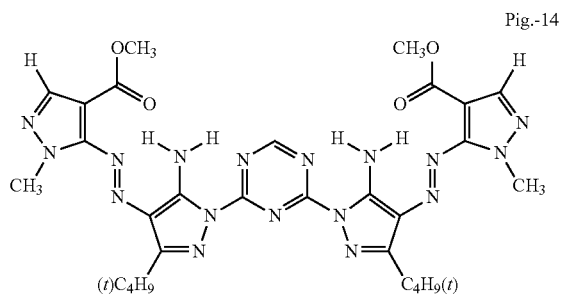
Pig.-14
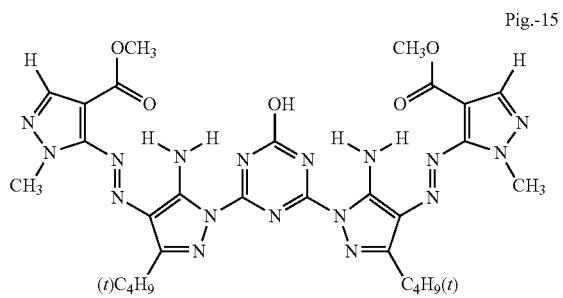
Pig.-15
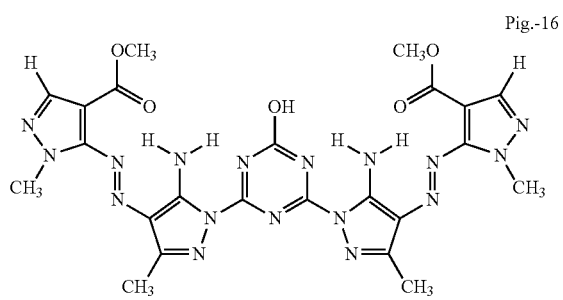
Pig.-16
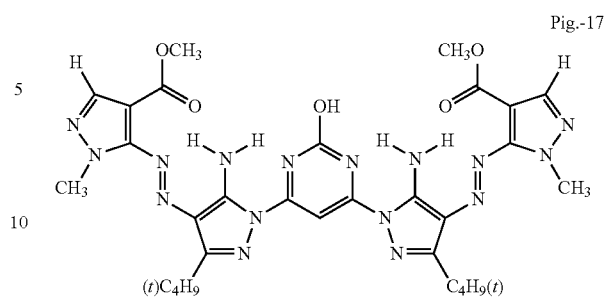
Pig.-17
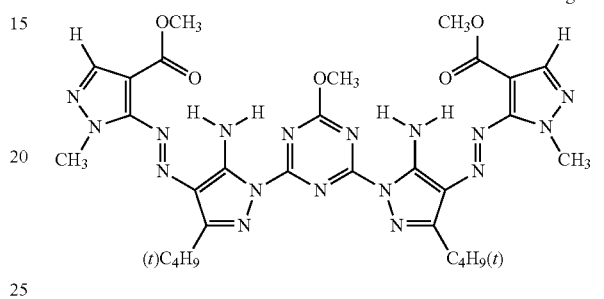
Pig.-18
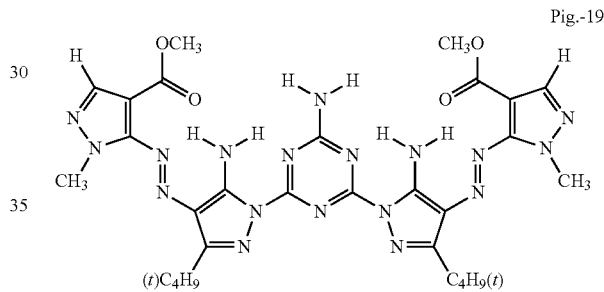
Pig.-19
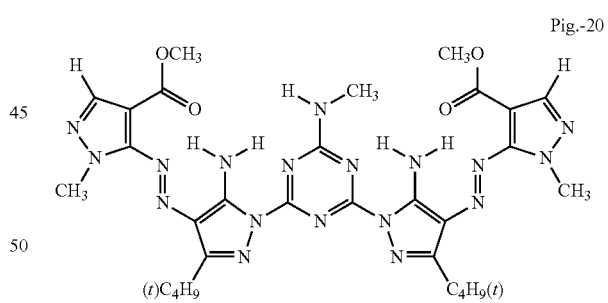
Pig.-20
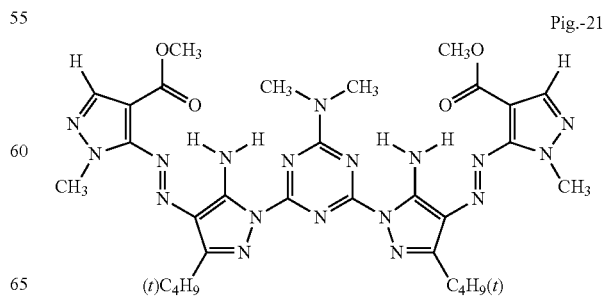
Pig.-21

-continued

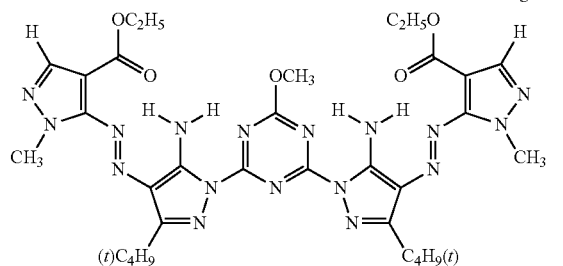
Pig.-44

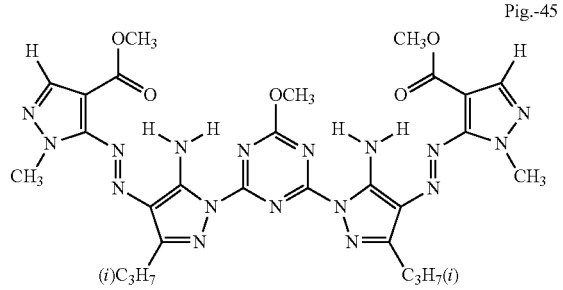
Pig.-45

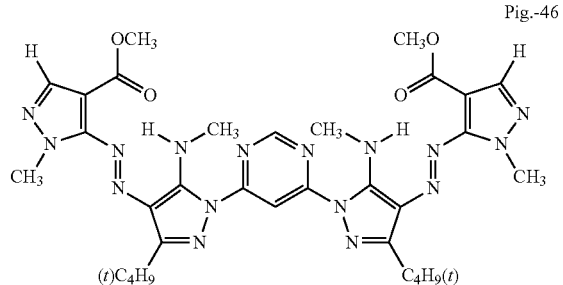
Pig.-46

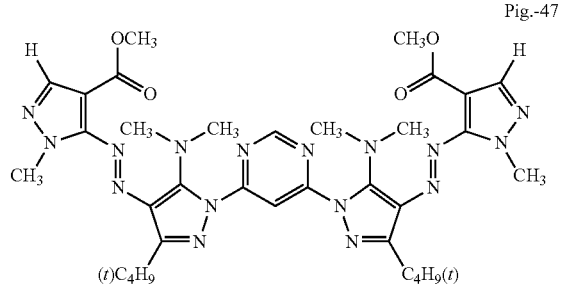
Pig.-47

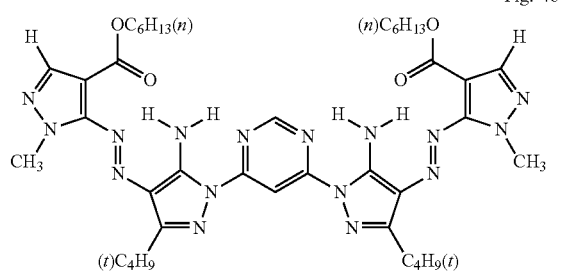
Pig.-48

There is no particular limitation on the crystal form of the azo pigment represented by the formula (1) as long as the azo pigment has a chemical structure of the formula (1) or a tautomer thereof. For example, an azo pigment of any crystal form, which is also referred to as polymorphism (crystal polymorphism), may also be used.

Crystal polymorphism means crystals that have the same chemical composition but have different arrangements of building blocks (molecules or ions) in the crystal. In regard to the crystal polymorphism, the chemical and physical properties are determined by the crystal structure, and the various forms of crystal polymorphism can be respectively distinguished by rheological properties, color and other chromatic properties. Furthermore, different forms of crystal polymorphism can also be examined by X-ray diffraction (results of powder X-ray diffraction measurement) or X-ray analysis (results of X-ray crystal structure analysis).

If the azo pigment represented by the formula (1) according to the invention has crystal polymorphism, the crystal form may be any of the polymorphs or may be a mixture of two or more polymorphs, but it is preferable to use a pigment having a single crystal form as a main component. That is, it is preferably to have fewer crystal polymorphs incorporated into the pigment, and the content of the azo pigment having a single crystal form is 70% to 100%, preferably 80% to 100%, more preferably 90% to 100%, even more preferably 95% to 100%, and particularly preferably 100%, based on the total amount of the azo pigment.

When an azo pigment having a single crystal form is contained as a main component, the regularity in the arrangement of colorant molecules is improved, and the intramolecular and intermolecular interactions are intensified, so that it becomes easy for the molecules to form a three-dimensional network of higher orders. As a result, it is preferable from the viewpoints of the performances required for pigments, such as color improvement, light fastness, heat fastness, moisture fastness, oxidative gas fastness and solvent resistance.

The mixing ratio of crystal polymorphs in the azo pigment can be examined from the physicochemical measurement values of solid such as single-crystal X-ray crystal structure analysis, powder X-ray diffraction (XRD), microscopic photographs (TEM) of crystals, infrared spectrometry (KBr method) or the like.

According to the invention, when the azo pigment represented by the formula (1) has an acid group, a part or all of the acid groups may be in a salt form, or a pigment having the acid group in a salt form and a pigment having the acid group in a free acid form may be present as a mixture. Examples of the salt form include salts of alkali metals such as sodium (Na), lithium (Li) and potassium (K); salts of ammonium which may be substituted with an alkyl group or a hydroxyalkyl group; or salts of organic amines. Examples of the organic amines include lower alkylamines, hydroxy-substituted lower alkylamines, carboxy-substituted lower alkylamines, polyamines having 2 to 10 alkyleneimine units each having 2 to 4 carbon atoms, and the like. In the case of these salt forms, the type is not limited to one type, and plural types may be present as a mixture.

Furthermore, in regard to the structure of the azo pigment used in the invention, if plural acid groups are contained in one molecule, the plural acid groups may be each independently in a salt form or in an acid form, and may be different from each other.

According to the invention, the azo pigment represented by the formula (1) may be a hydrate containing water molecules in the crystals, and there is no particular limitation on the number of water molecules contained in the crystals.

Next, an example of the method for producing the azo pigment represented by the formula (1) will be explained. For example, a heterocyclic amine represented by the following formula (A) is subjected to diazotization under acidic conditions, the product is subjected to a coupling reaction with a compound represented by the following formula (B), and the product is subjected to a post-treatment according to a conventional method. Thereby, the azo pigment represented by the formula (1) can be produced.

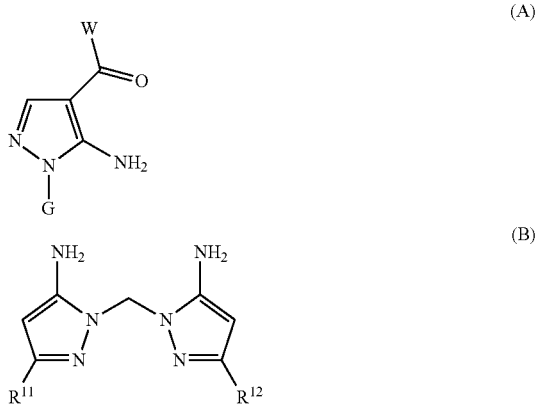

In the formulas (A) and (B), W has the same definition as $W^1$ and $W^2$ in the formula (1); G has the same definition as $G^1$ and $G^2$ in the formula (1); and $R^{11}$, $R^{12}$ and Z have the same definitions as $R^{11}$, $R^{12}$ and Z in the formula (1).

The heterocyclic amine represented by the formula (A) can be produced by a generally known conventional method, for example, a method described in Hely. Chim. Acta, 41, 1958, 1052-1056; Hely. Chim. Acta, 42, 1959, 349-352; or the like, or a method equivalent thereto.

Furthermore, the compound represented by the formula (B) can be produced by a method described in International Publication No. WO 06/082669 or Japanese Patent Application Laid-Open (JP-A) No. 2006-57076, or a method equivalent thereto.

The diazotization reaction of the heterocyclic amine represented by the formula (A) can be carried out by, for example, a reaction with a reagent such as sodium nitrite, nitrosylsulfuric acid or isoamyl nitrite at a temperature of 15° C. or lower for about 10 minutes to 6 hours, in an acidic solvent such as sulfuric acid, phosphoric acid, acetic acid, hydrochloric acid or methanesulfonic acid.

The coupling reaction can be carried out by reacting the diazonium salt obtained by the method described above with the compound represented by the formula (B) at 40° C. or lower, and preferably 25° C. or lower, for about 10 minutes to 12 hours.

The product obtained by such a reaction may have crystals precipitated, but in general, crystals are precipitated by adding water or an alcohol-based solvent to the reaction liquid, and the crystals can be collected by filtration. Furthermore, crystals can be precipitated by adding an alcohol-based solvent, water or the like to the reaction liquid, and the precipitated crystals can be collected by filtration. The crystals collected by filtration can be washed and dried as necessary, and thus the azo pigment represented by the formula (1) can be obtained.

According to the production method described above, the azo pigment represented by the formula (1) is obtained as a crude azo pigment (crude), but when used as a coloring material according to the invention, it is preferable to carry out a post-treatment. Examples of this post-treatment include pigment particle controlling processes based on grinding treatments such as solvent salt milling, salt milling, dry milling, solvent milling and acid pasting, solvent heating treatments, and the like; and surface treatment processes making use of resins, surfactants, dispersants and the like.

The azo pigment represented by the formula (1) of the invention is preferably subjected to solvent heating treatment and/or solvent salt milling, as post-treatments.

Examples of the solvent used in the solvent heating treatment include water; aromatic hydrocarbon solvents such as toluene and xylene; halogenated hydrocarbon solvents such as chlorobenzene and o-dichlorobenzene; alcohol-based solvents such as isopropanol and isobutanol; polar aprotic organic solvents such as N,N-dimethylformamide, N,N-dimethylacetamide and N-methyl-2-pyrrolidone; glacial acetic acid, pyridine, mixtures thereof, and the like. An inorganic or organic acid or base may be further added to the solvents mentioned above. The temperature for the solvent heating treatment may vary according to the primary particle diameter of the desired pigment, but the temperature is preferably 40 to 150° C., and more preferably 60 to 100° C. The treatment time is preferably 30 minutes to 24 hours.

The solvent salt milling may be carried out by, for example, introducing a crude azo pigment and an inorganic salt together with an organic solvent that does not dissolve the inorganic salt into a kneading machine, and performing kneading pulverization in the kneading machine. A water-soluble inorganic salt can be suitably used as the inorganic salt, and it is preferable to use, for example, an inorganic salt such as sodium chloride, potassium chloride or sodium sulfate. Furthermore, it is more preferable to use an inorganic salt having an average particle diameter of 0.5 to 50 μm. The amount of use of the inorganic salt is preferably set at 3 to 20-fold by mass, and more preferably at 5 to 15-fold by mass, of the amount of the crude azo pigment. A water-soluble organic solvent can be suitably used as the organic solvent. However, since the temperature increase during the kneading brings about a state in which the solvent is prone to evaporate, a solvent with high boiling point is preferred from the viewpoint of safety.

Examples of such a water-soluble organic solvent include diethylene glycol, glycerin, ethylene glycol, propylene glycol, liquid polyethylene glycol, liquid polypropylene glycol, 2-(methoxymethoxy)ethanol, 2-butoxyethanol, 2-(isopentyloxy)ethanol, 2-(hexyloxy)ethanol, diethylene glycol monomethyl ether, diethylene glycol monoethyl ether, diethylene glycol monobutyl ether, triethylene glycol, triethylene glycol monomethyl ether, 1-methoxy-2-propanol, 1-ethoxy-2-propanol, dipropylene glycol, dipropylene glycol monomethyl ether, dipropylene glycol monomethyl ether, dipropylene glycol, and mixtures thereof. The amount of use of the water-soluble organic solvent is preferably 0.1 to 5-fold by mass of the amount of the crude azo pigment. The kneading temperature is preferably 20 to 130° C., and particularly preferably 40 to 110° C. As the kneading machine, for example, a kneader, a mix muller or the like can be used.

The content of the azo pigment (coloring material) used in the invention is preferably 0.1 to 15% by mass, and more preferably 1 to 8% by mass, of the ink composition. The amount of incorporation of the pigment used in the invention is appropriately adjusted in accordance with the type of the ink composition, such as a concentrated ink composition or a diluted ink composition.

The volume average particle diameter of the azo pigment (coloring material) used in the invention is preferably 250 nm or less, and more preferably 150 nm or less, from the viewpoint of the stability of the ink composition. Furthermore, when an azo pigment having a volume average particle diameter of 120 nm or less is used, it is even more preferable because the effects of the invention can be further enhanced.

The volume average particle diameter is measured under conventional conditions using a dynamic light scattering method.

(Dispersant)

The aqueous ink composition for inkjet recording of the invention contains at least one dispersant, but it is preferable to have the azo pigment dispersed in an aqueous medium by the dispersant.

The dispersant according to the invention is not particularly limited, and a conventionally used dispersant can be appropriately selected and used. Among others, the dispersant is preferably a synthetic macromolecular compound, and more preferably a copolymer containing at least one hydrophilic constituent unit and at least one hydrophobic constituent unit, from the viewpoints of dispersion stability and jetting recoverability of the ink composition. The copolymer is not particularly limited in the form, and may be a random copolymer, a block copolymer or the like.

Specific examples of the dispersant include polyvinyl alcohols; polyvinylpyrrolidones; acrylic resins such as polyacrylic acid, an acrylic acid-acrylonitrile copolymer, a potassium acrylate-acrylonitrile copolymer, a vinyl acetate-acrylic acid ester copolymer and an acrylic acid-acrylic acid ester copolymer; styrene-acrylic resins such as a styrene-acrylic acid copolymer, a styrene-methacrylic acid copolymer, a styrene-methacrylic acid-acrylic acid ester copolymer, a styrene-α-methylstyrene-acrylic acid copolymer and a styrene-α-methylstyrene-acrylic acid-acrylic acid ester copolymer; vinyl acetate-based copolymers such as a styrene-maleic acid copolymer, a styrene-maleic anhydride copolymer, a vinylnaphthalene-acrylic acid copolymer, a vinylnaphthalene-maleic acid copolymer and a vinyl acetate-ethylene copolymer, a vinyl acetate-fatty acid vinyl ethylene copolymer, a vinyl acetate-maleic acid ester copolymer, a vinyl acetate-crotonic acid copolymer, and a vinyl acetate-acrylic acid copolymer; and salts thereof.

These can be used singly or as mixtures of two or more kinds at the time of use.

If the dispersant is in the form of a salt, examples of the base for forming the salt include diethylamine, ammonia, ethylamine, triethylamine, propylamine, isopropylamine, dipropylamine, butylamine, isobutylamine, triethanolamine, diethanolamine, aminomethylpropanol, morpholine, and the like.

These salts can be obtained by, for example, subjecting the dispersant in a state prior to salt formation and one of the bases mentioned above, to a neutralization reaction. At this time, the amount of use of the compound for forming a salt can be set at, for example, 0.7 to 1.5 equivalents relative to the neutralization equivalent of the dispersant in a state prior to salt formation. Particularly, in view of increasing the fixability of the ink to a recording medium after performing printing with the ink composition onto a recording medium, the amount of use is preferably 0.9 to 1.2 equivalents relative to the neutralization equivalent.

The weight average molecular weight of such a synthetic macromolecular compound is preferably 1000 to 50,000, more preferably 1000 to 15,000, and even more preferably 3000 to 10,000. The acid value of the synthetic macromolecular compound is preferably 50 to 300, and more preferably 70 to 150. The synthetic macromolecular compound may be produced according to a known polymerization method such as radical copolymerization or group transfer polymerization.

Furthermore, a natural macromolecular compound can also be used as the dispersant. Specific examples thereof include proteins such as glue, gelatin, casein and albumin; natural rubbers such as gum arabic and tragacanth gum; glucosides such as saponin; alginic acid derivatives such as alginic acid, alginic acid propylene glycol ester, alginic acid triethanolamine, and ammonium alginate; cellulose derivatives such as methylcellulose, carboxymethylcellulose, hydroxyethylcellulose and ethylhydroxycellulose; and the like.

In regard to the dispersant, commercially available dispersants can be used, and specific examples thereof include JONCRYL 61J (molecular weight 10,000, acid value 195), JONCRYL 68 (molecular weight 10,000, acid value 195), JONCRYL 450 (molecular weight 10,000 to 20,000, acid value 100), JONCRYL 550 (molecular weight 7500, acid value 200), JONCRYL 555 (molecular weight 5000, acid value 200), JONCRYL 586 (molecular weight 3100, acid value 105), JONCRYL 680 (molecular weight 3900, acid value 215), JONCRYL 682 (molecular weight 1600, acid value 235), JONCRYL 683 (molecular weight 7300, acid value 150), and JONCRYL B-36 (molecular weight 6800, acid value 250) (all trade names, manufactured by BASF Japan, Ltd.), and the like. Here, the molecular weight represents a weight average molecular weight.

According to the invention, a particularly preferred dispersant is a salt of a styrene-(meth)acrylic acid copolymer, in view of dispersion stability. Such a salt of the a styrene-(meth)acrylic acid copolymer is a compound basically having at least a styrene skeleton and a skeleton of a (meth)acrylic acid salt in the structure, and may have a skeleton derived from another monomer having an unsaturated group, such as a (meth)acrylic acid ester skeleton, in the structure. In regard to the mode of copolymerization, production method, acid value and weight average molecular weight of such a styrene-(meth)acrylic acid copolymer salt, the same suitable terms for the synthetic macromolecular compounds mentioned above apply.

The dispersant can be added into water and can be used in the form of an emulsion.

The content of the dispersant is preferably 1 to 100 parts by mass, and more preferably 2 to 70 parts by mass, relative to 100 parts by mass of the pigment.

The azo pigment according to the invention is preferably used as a pigment dispersion liquid, in which the azo pigment is dispersed by the dispersant described above. The pigment dispersion liquid is prepared by dispersing the azo pigment, the dispersant and an aqueous medium using an appropriate dispersing machine such as a ball mill, a sand mill, an attriter, a roll mill, an agitator mill, a Henschel mixer, a colloid mill, an ultrasonic homogenizer, a jet mill or an Ongmill.

The aqueous medium that can be used in the preparation of the pigment dispersion liquid may be water, an organic solvent, or a mixture of water and an organic solvent. Water as used herein is preferably pure water, and examples of the organic solvent include monohydric alcohols such as methanol, ethanol, n-propyl alcohol, isopropyl alcohol, n-butanol, sec-butanol, tert-butanol, isobutanol and n-pentanol; polyhydric alcohols such as ethylene glycol, diethylene glycol, triethylene glycol, polyethylene glycol, polypropylene glycol, propylene glycol, butylene glycol, 1,2,6-hexanetriol, thioglycol, hexylene glycol, trimethylolethane and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea, 2-pyrrolidone, N-methyl-2-pyrrolidone, 1,3-dimethyl-2-imidazolidinone, triethanolamine, and the like. These organic solvents can be used singly or as mixtures of two or more kinds.

The amount of incorporation of the organic solvent is preferably in the range of 0.5 to 40% by weight, and more preferably 1.5 to 20% by weight, of the ink composition according to the invention.

(Water-Soluble Organic Solvent)

The aqueous ink composition for inkjet recording of the invention preferably contains a water-based medium. The water-based medium includes at least water as a solvent, but the water-based medium preferably contains water and at least one water-soluble organic solvent. The water-soluble organic solvent is used for the purpose of a wetting agent, a penetrating agent or the like.

The wetting agent can effectively prevent clogging of nozzles, which can occur as a result of drying of the ink at the ink jet nozzles. Furthermore, the wetting agent is preferably a water-soluble organic solvent having a lower vapor pressure than that of water.

Specific examples of the wetting agent include glycerin, ethylene glycol, diethylene glycol, triethylene glycol, polyethylene glycol having a molecular weight of 2000 or less, propylene glycol, dipropylene glycol, tripropylene glycol, 1,3-propylene glycol, isopropylene glycol, isobutylene glycol, 1,4-butanediol, 1,3-butanediol, 1,5-pentanediol, 1,6-hexanediol, mesoerythritol, pentaerythritol, and the like. These wetting agents may be used singly or as mixtures of two or more kinds.

It is preferable to use glycerin in particular as the wetting agent, because it becomes difficult for the ink composition to solidify due to the high water-solubility and the moisture evaporation suppressive effect of glycerin, and thereby the effect of preventing clogging in the nozzles of the printer head is even further increased.

The content of the wetting agent in the ink composition according to the invention is preferably 0.05 to 30% by mass, and more preferably 3 to 25% by mass.

The penetrating agent is suitably used for the purpose of effectively penetrating the ink composition into a recording medium (for example, printing paper or the like).

Specific examples of the penetrating agent include alkyl ethers of polyhydric alcohols (glycol ethers), such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol monoisopropyl ether, diethylene glycol monoisopropyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol monoisopropyl ether, propylene glycol mono-n-butyl ether, dipropylene glycol mono-n-butyl ether, dipropylene glycol monomethyl ether, dipropylene glycol monoethyl ether, dipropylene glycol mono-n-propyl ether, and dipropylene glycol monoisopropyl ether; and diols such as 1,2-pentanediol and 1,2-hexanediol. These penetrating agents may be used singly or as mixtures of two or more kinds.

According to the invention, it is preferable to use 1,2-hexanediol or triethylene glycol monobutyl ether in particular as the penetrating agent.

The amount of incorporation of the penetrating agent is preferably 0.1 to 20% by weight, and more preferably 0.5 to 15% by weight, of the ink composition according to the invention.

The water-soluble organic solvent can also be used for the adjustment of viscosity, in addition to the purposes mentioned above. Specific examples of the water-soluble organic solvent that can be used in the adjustment of viscosity include alcohols (for example, methanol, ethanol, propanol, isopropanol, butanol, isobutanol, sec-butanol, t-butanol, pentanol, hexanol, cyclohexanol and benzyl alcohol); polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol and thiodiglycol); glycol derivatives (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether and ethylene glycol monophenyl ether); amines (for example, ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine and tetramethylpropylenediamine); and other polar solvents (for example, formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone).

The ink composition of the invention preferably contains at least one surfactant. Examples of such a surfactant that can be used include acetylene glycol-based surfactants represented by the following formula (11) (for example, trade names: ORFIN Y, E1010 and STG, and SURFINOL 82, 104, 440, 465 and 485; all manufactured by Nissin Chemical Co., Ltd.); and polysiloxane-based compounds represented by the following formula (12) (for example, silicone-based surfactants, BYK-345, BYK-346, BYK-347 and BYK-348; manufacture and marketed by BYK-Chemie KK). In addition to these, anionic surfactants (for example, sodium dodecyl benzenesulfonate, sodium laurate, an ammonium salt of polyoxyethylene alkyl ether sulfate, and the like), nonionic surfactants (for example, polyoxyethylene alkyl ether, polyoxyethylene alkyl ester, polyoxyethylene sorbitan fatty acid ester, polyoxyethylene alkyl phenyl ether, polyoxyethylene alkylamine, polyoxyethylene alkylamide, and the like), and the like can be used.

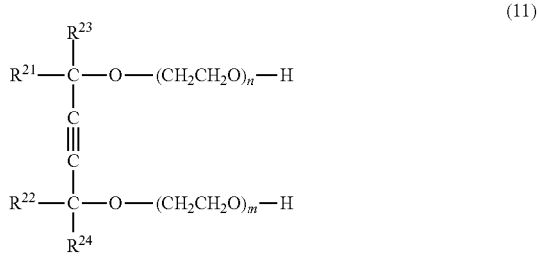

(11)

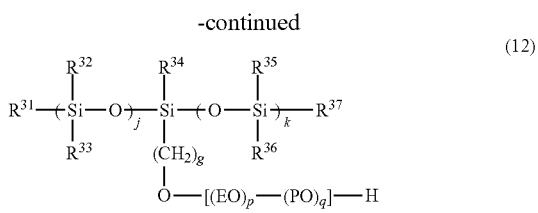

(12)

In the formula (11), $0 \leq m+n \leq 50$, and $R^{21}$ to $R^{24}$ each independently represent an alkyl group having 1 to 6 carbon atoms.

In the formula (12), $R^{31}$ to $R^{37}$ each independently represent an alkyl group having 1 to 6 carbon atoms; j, k and g each independently represent an integer of 1 or greater; EO represents an ethyleneoxy group; PO represents a propyleneoxy group; and p and q are each an integer of 0 or greater provided that p+q is an integer of 1 or greater, the linkage of EO and PO in the brackets [ ] may be random or in block, and the order of the units are not limited.

These surfactants may be used singly or as mixtures of two or more kinds.

The amount of incorporation of the surfactant is preferably 0.01 to 10% by mass, and more preferably 0.1 to 5% by mass, of the ink composition of the invention.

(Other Additives)

The ink composition for inkjet of the invention can contain other additives if necessary, in addition to the components described above.

Examples of the other additives according to the invention include known additives such as a discoloration preventing agent, an emulsion stabilizer, an ultraviolet absorbent, an antiseptic, an antimicrobial agent, a pH adjusting agent, a surface tension adjusting agent, a defoaming agent, a viscosity adjusting agent, a dispersion stabilizer, an antirust agent and a chelating agent. These various additives may be added directly after the preparation of the ink composition for inkjet, or may be added during the preparation of the ink composition for inkjet. Specifically, those additives described in paragraphs [0153] to [0162] of JP-A No. 2007-100071 may be mentioned.

In regard to the surface tension of the ink composition of the invention, from the viewpoints of enhancement of penetrability into a recording medium such as paper, satisfactory spreading of dots on a recording medium, prevention of color bleeding, dryability and the like, the surface tension is preferably 40 mN/m or less, and more preferably 28 to 35 mN/m.

The surface tension of the ink composition can be measured by, for example, an analytic apparatus such as a Face automatic surface tensiometer, "CPVP-Z" (trade name, manufactured by Kyowa Interface Science Co., Ltd.).

The viscosity of the ink composition of the invention is preferably in the range of 1 to 30 mPa·s, more preferably in the range of 1 to 20 mPa·s, even more preferably in the range of 2 to 15 mPa·s, and particularly preferably in the range of 2 to 10 mPa·s, from the viewpoint of the stability of droplet jetting.

The viscosity of the ink composition can be measured, for example, at 20° C. using a Brookfield viscometer.

The pH of the ink composition of the invention is preferably pH 7.5 to 10, and more preferably pH 8 to 9, from the viewpoint of ink stability. The pH of the ink composition is measured at 25° C. using a conventionally used pH measuring apparatus [for example, a multi water quality meter (trade name: MM-60R, manufactured by DKK-To a Corp.)].

Furthermore, the pH of the ink composition can be appropriately adjusted by using an acidic compound or a basic compound. As the acidic compound or basic compound, any conventionally used compound can be used without particular limitation.

The aqueous ink composition for inkjet recording of the invention can be prepared by mixing a coloring material containing at least one selected from the group consisting of azo pigments represented by the formula (1) and tautomers thereof, and salts and hydrates thereof; at least one dispersant; and at least one urethane-modified polyester resin; and if necessary, at least one water-soluble organic solvent, a surfactant, and the like. The liquid composition obtainable by mixing these components may be used as an ink composition, or the liquid composition may be subjected to treatments such as filtration and sterilization (for example, heat treatment) and may be used as an ink composition.

Regarding the method of filtration, for example, filtration using a membrane filter (for example, a 5-μm PVDF filter) may be mentioned. Regarding the sterilization treatment, a heat treatment (for example, 1 to 4 hours at 60 to 80° C.) may be mentioned.

According to the invention, it is preferable to sterilize (preferably, heat-treating) the liquid composition, from the viewpoint of ink stability.

<Inkjet Image Forming Method>

The inkjet image forming method of the invention includes an ink jetting step of forming an image by jetting the aqueous ink composition for inkjet recording onto a recording medium, and may further include other steps as necessary.

When images are formed by using the aqueous ink composition for inkjet recording of the invention, images having excellent light resistance can be formed. Furthermore, since the ink composition is excellent in jetting stability and jetting recoverability even after a long-term or high-temperature storage, satisfactory images can be formed.

In the ink jetting step, the aqueous ink composition for inkjet recording of the invention described above is applied onto a recording medium by an inkjet method. In the present step, the ink composition can be selectively applied onto the recording medium, and thus a desired visible image can be formed. The details of the components in the ink composition of the invention and the details of preferred embodiments are as described above.

Recording of images using an inkjet method can be carried out by jetting, by donating energy, a liquid composition onto a desired recording medium, that is, ordinary paper, resin-coated paper, paper exclusive for inkjet use described in, for example, JP-A Nos. 8-169172, 8-27693, 2-276670, 7-276789, 9-323475, 62-238783, 10-153989, 10-217473, 10-235995, 10-217597, 10-337947 and the like, film, paper for common use for general purpose and electrophotography, cloth, glass, metal, porcelain, or the like. Furthermore, as an inkjet recording method preferable for the invention, the method described in paragraphs [0093] to [0105] of JP-A No. 2003-306623 can be applied.

The inkjet method is not particularly limited, and may be any of known methods such as, for example, a charge control method of jetting an ink by utilizing electrostatic attraction force; a drop-on-demand method of utilizing the vibration pressure of a piezo element (pressure pulse method); an acoustic inkjet method of converting electric signals into an acoustic beam, irradiating an ink with the acoustic beam, and jetting the ink using radiation pressure; a thermal inkjet (BUBBLEJET (registered trademark)) method of heating an ink to form air bubbles, and utilizing the pressure resulting therefrom; and the like.

Examples of the inkjet method also include a method of jetting a low-concentration ink called photoink in the form of many droplets having small volumes; a method of improving the image quality using plural inks having a substantially same color but different concentrations; and a method of utilizing a colorless transparent ink.

According to the invention, for example, the following embodiments <1> to <11> are provided.

<1> An aqueous ink composition for inkjet recording, comprising: a coloring material containing at least one selected from the group consisting of azo pigments represented by the following formula (1) and tautomers thereof, and salts and hydrates thereof; a dispersant; and a urethane-modified polyester resin

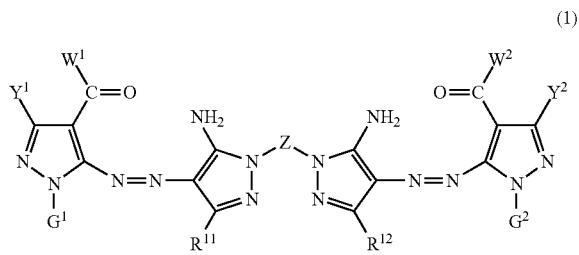

(1)

wherein Z represents a divalent group derived from a 5- to 8-membered nitrogen-containing heterocycle; $Y^1$, $Y^2$, $R^{11}$ and $R^{12}$ each independently represent a hydrogen atom or a substituent; $G^1$ and $G^2$ each independently represent a hydrogen atom, an alkyl group, an aralkyl group, an alkenyl group, an alkynyl group, an aryl group or a heterocyclic group; and $W^1$ and $W^2$ each independently represent an alkoxy group, an amino group, an alkyl group or an aryl group.

<2> The aqueous ink composition for inkjet recording of <1>, wherein $W^1$ and $W^2$ in formula (1) each independently represent an alkoxy group having 3 or fewer carbon atoms in total, an amino group, or an alkylamino group having 3 or fewer carbon atoms in total.

<3> The aqueous ink composition for inkjet recording of <1> or <2>, wherein $G^1$ and $G^2$ in formula (1) each independently represent an alkyl group having 3 or fewer carbon atoms in total.

<4> The aqueous ink composition for inkjet recording of any one of <1> to <3>, wherein Z in formula (1) represents a divalent group derived from a 6-membered nitrogen-containing heterocycle.

<5> The aqueous ink composition for inkjet recording of any one of <1> to <4>, wherein the urethane-modified polyester resin contains a structural unit derived from a polyester polyol obtained from an alkanediol and a polybasic acid or an acid anhydride thereof, and a structural unit derived from an organic polyisocyanate.

<6> The aqueous ink composition for inkjet recording of <5>, wherein the alkanediol includes 3-methylpentanediol, the polybasic acid includes adipic acid, and the organic polyisocyanate includes isophorone diisocyanate.

<7> The aqueous ink composition for inkjet recording of any one of <1> to <6>, wherein the mass ratio of the urethane-modified polyester resin to the coloring material (urethane-modified polyester resin/coloring material) is 0.05 or greater.

<8> The aqueous ink composition for inkjet recording of any one of <1> to <7>, comprising the coloring material in an amount of 0.3 to 8% by mass.

<9> The aqueous ink composition for inkjet recording of any one of <1> to <8>, wherein the volume average particle diameter of the coloring material is 150 nm or less.

<10> The aqueous ink composition for inkjet recording of any one of <1> to <9>, wherein the dispersant is a copolymer containing a hydrophilic structural unit and a hydrophobic structural unit.

<11> A method for forming an inkjet image, comprising jetting the aqueous ink composition for inkjet recording of any one of <1> to <10>, onto a recording medium by an inkjet method.

Therefore, according to the invention, there can be provided an aqueous ink composition for inkjet recording having excellent jetting recoverability even after high temperature storage of the ink composition, and having satisfactory light resistance, and an inkjet image forming method making use of the aqueous ink composition for inkjet recording.

EXAMPLES

Hereinafter, the present invention will be specifically explained by way of Examples, but the invention is not intended to be limited to these Examples. Furthermore, unless particularly stated otherwise, the term "parts" and "%" are on a mass basis.

(Synthesis of Yellow Pigment)

[Synthesis Example 1]

—Synthesis of Exemplified Compound (Pig.-1)—

The synthesis scheme for the exemplified compound (Pig.-1) is as shown below.

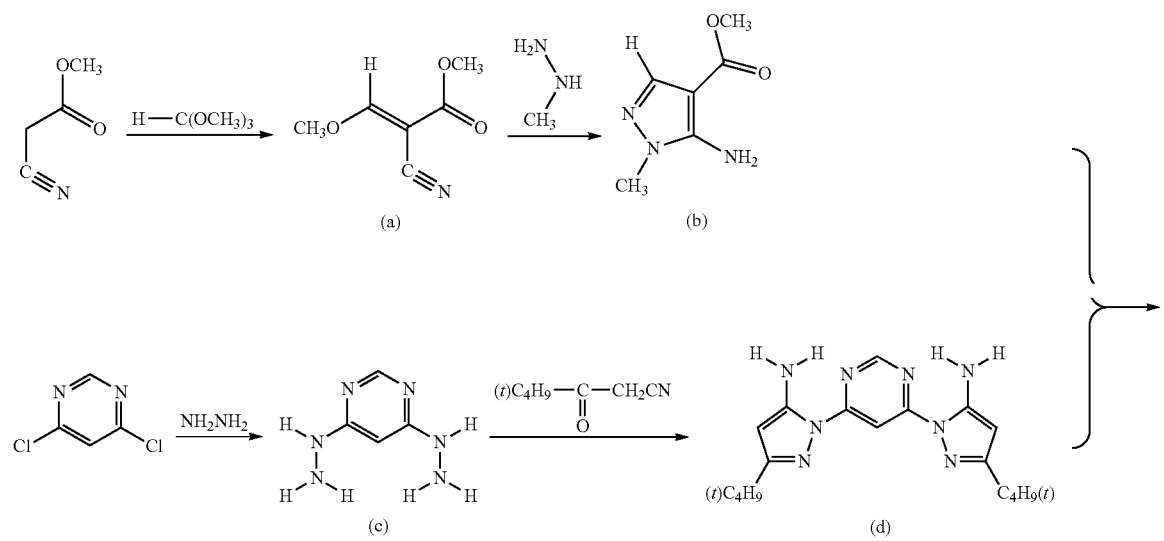

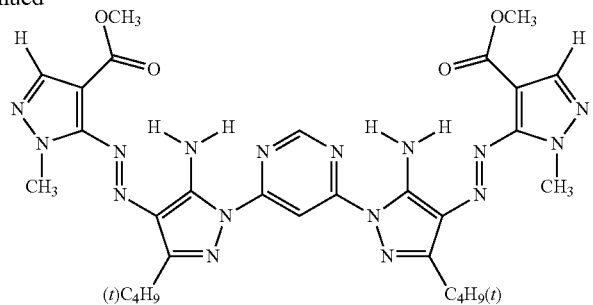

Pig.-1

(1) Synthesis of Intermediate (a)

29.7 g (0.3 moles) of methyl cyanoacetate was mixed with 42.4 g (0.4 moles) of trimethyl orthoformate, 20.4 g (0.2 moles) of acetic anhydride, and 0.5 g of p-toluenesulfonic acid, and the mixture was heated to 110° C. (external temperature). While the low-boiling point components generated from the reaction system were distilled off, the reaction mixture was stirred for 20 hours. This reaction liquid was concentrated under reduced pressure, and then silica gel column purification was carried out. Thus, 14.1 g (yellow powder, yield 30%) of the intermediate (a) was obtained. The NMR measurement results for the obtained intermediate (a) are as follows.

$^1$H-NMR (300 MHz, CDCl$_3$) 7.96 (s, 1H), 4.15 (s, 3H), 3.81 (s, 3H)

(2) Synthesis of Intermediate (b)

150 mL of isopropanol was added to 7.4 mL (141 millimoles) of methylhydrazine, and the mixture was cooled to 15° C. (internal temperature). 7.0 g (49.6 millimoles) of the intermediate (a) was slowly added to the obtained mixture liquid, and then the resulting mixture was heated to 50° C. and stirred for 1 hour and 40 minutes. This reaction liquid was concentrated under reduced pressure, and then silica gel column purification was carried out. Thus, 10.5 g (white powder, yield 50%) of the intermediate (b) was obtained. The NMR measurement results for the obtained intermediate (b) are as follows.

$^1$H-NMR (300 MHz, CDCl$_3$) 7.60 (s, 1H), 4.95 (brs, 2H), 3.80 (s, 3H), 3.60 (s, 3H)

(3) Synthesis of Intermediate (c)

100 mL of methanol was added to 130 mL of hydrazine monohydrate, and the mixture was cooled to 10° C. (internal temperature). 50.0 g (336 millimoles) of 4,6-dichloropyrimidine was slowly added (internal temperature 20° C. or lower) to the obtained mixed liquid, and then the resulting mixture was heated to 50° C. and stirred for 4 hours and 30 minutes. The crystals precipitated from the reaction liquid were collected by filtration, rinsed with isopropanol, and then dried. Thus, 43.1 g (white powder, yield 92%) of the intermediate (c) was obtained. The NMR measurement results for the obtained intermediate (c) are as follows.

$^1$H-NMR (300 MHz, d$_6$-DMSO) 7.82 (s, 1H), 7.55 (s, 2H), 5.96 (s, 1H), 4.12 (s, 4H)

(4) Synthesis of Intermediate (d)

900 mL of water was added to 35.0 g (0.25 moles) of the intermediate (c) and 68.8 g (0.55 moles) of pivaloylacetonitrile, and the mixture was stirred at room temperature. A 1 M aqueous solution of hydrochloric acid was added dropwise to the obtained suspension to have a pH of 3, and then the resulting mixture was heated to 50° C. and stirred for 8 hours. An 8 M aqueous solution of potassium hydroxide was added dropwise to the reaction liquid to have a pH of 8, and then a 1 M aqueous solution of hydrochloric acid was added dropwise thereto to have a pH of 6. The crystals thus precipitated were collected by filtration, rinsed with isopropanol, and then dried. Thus, 83.0 g (white powder, yield 94%) of the intermediate (d) was obtained. The NMR measurement results for the obtained intermediate (d) are as follows.

$^1$H-NMR (300 MHz, d$_6$-DMSO) 8.73 (s, 1H), 7.97 (s, 1H), 6.88 (s, 4H), 5.35 (s, 2H), 1.22 (s, 18H)

(5) Synthesis of Exemplified Compound (Pig.-1)

18.5 mL of acetic acid was added to 4.1 mL of concentrated sulfuric acid, and the mixture was stirred under ice cooling. 3.85 g (12.1 millimoles) of 40% nitrosyl sulfate was added dropwise thereto. 1.71 g (11.0 millimoles) of the intermediate (b) was slowly added (internal temperature 0° C. or lower) to the obtained mixture liquid, and then the mixture was stirred for 2 hours at 0° C. 150 mg of urea was added to this reaction liquid, and the mixture was stirred for 15 minutes at 0° C. Thus, a diazo liquid A was prepared.

50 mL of methanol was added to the intermediate (d), and the mixture was heated to dissolve. Subsequently the diazo liquid A was slowly added dropwise to the mixture liquid stirred under ice cooling (internal temperature 10° C. or lower). This reaction liquid was stirred for 2 hours at room temperature, and then precipitated crystals were collected by filtration. The crystals were rinsed with methanol, and thereby crude crystals of the exemplified compound (Pig.-1) were obtained. Water was further added to the crude crystals under stirring, and then this suspension was adjusted to have a pH of 7 using an aqueous solution of sodium hydroxide. 20 mL of dimethylacetamide was further added thereto, and the resulting mixture was stirred for 2 hours at 80° C. Precipitated crystals were collected by filtration and washed by suspending in methanol. The crystals thus obtained were collected by filtration and dried. Thus, 2.0 g (yellow powder, yield 79%) of the exemplified compound (Pig.-1) was obtained.

Furthermore, exemplified compounds (Pig.-2) to (Pig.-4), (Pig.-6), (Pig.-9) to (Pig.-12), (Pig.-15), (Pig.-18), (Pig.-19), (Pig.-21), (Pig.-24), (Pig.-25), and (Pig.-34) to (Pig.-37) were respectively synthesized in the same manner as in the synthesis scheme shown above.

(Preparation of Urethane-Modified Polyester Resin)

In a pressurized polymerization vessel equipped with a thermometer and a stirrer, 205.0 parts of adipate diol (number average molecular weight 2000), which was obtainable by dehydration copolymerizing 3-methylpentanediol and adipic acid, 8.5 parts of 1,4-butanediol, 3.8 parts of n-butanol, 48.5 parts of dimethylolpropionic acid, 140.0 parts of isophorone diisocyanate and 265.5 parts of methyl ethyl ketone were introduced. After the air in the reaction system was replaced with nitrogen gas, reaction was carried out for 7 hours, and thus a urethane-modified polyester resin was obtained. The obtained solution was cooled to room temperature, 31.5 parts of triethylamine was added, and then 1400 parts of ion-exchanged water was added thereto. Methyl ethyl ketone was distilled off under reduced pressure, and thus a 25% aqueous solution of urethane-modified polyester resin was obtained. The molecular weight of this resin was 13500, and the acid value was 67.

<Example 1>

(Preparation of Yellow Pigment Dispersion YD-1)

A yellow pigment dispersion YD-1 was prepared as follows.

10.0 parts of the exemplified compound (Pig.-1), which was a yellow azo pigment, was mixed with 4.0 parts of a styrene-acrylic acid-based macromolecular dispersant (trade name: "JONCRYL 68", manufactured by BASF Japan Co., Ltd.; weight average molecular weight 10,000, acid value 195 mg KOH/g) and ion-exchanged water in an amount to adjust the total amount of the mixture to 100 parts. The mixture liquid was then stirred with a dissolver until the liquid became uniform, and thus a pre-dispersion liquid was obtained. The obtained pre-dispersion liquid was subjected to a dispersion treatment for 5 hours in a bead mill using 0.1-μmφ zirconia beads. After the dispersion, the zirconia beads were removed, and a pigment dispersion liquid was obtained. The pigment dispersion liquid was subjected to sterilization at 70° C. for 3 hours, and then pure water was added thereto so that the pigment concentration would be 10%. Thus, the yellow pigment dispersion YD-1 was prepared.

—Measurement of Particle Diameter of Yellow Pigment Dispersion—

For the obtained yellow pigment dispersion, the volume average particle diameter (My) was measured by a dynamic light scattering method using a Nanotrac particle size distribution analyzer (trade name: UPA-EX150, manufactured by Nikkiso Co., Ltd.), and the volume average particle diameter was evaluated according to the following evaluation criteria.

—Evaluation Criteria—

A: My was less than 90 nm.

B: My was equal to or greater than 90 nm, and less than 120 nm.

C: My was equal to or greater than 120 nm.

(Preparation of Aqueous Ink Composition for Inkjet Recording YI-1)

The yellow pigment dispersion YD-1 obtained as described above and the urethane-modified polyester resin were used, and various components were mixed therewith to obtain the ink composition shown below. Thus, an aqueous ink composition for inkjet recording YI-1 was prepared.

<Composition of Aqueous Yellow PIGMENT ink YI-1>

| | |
|---|---|
| Yellow pigment dispersion YD-1 | 25.0 parts |
| BYK347 | 0.5 parts |
| 1,2-Hexanediol | 10.0 parts |
| Glycerin | 12.0 parts |
| Triethanolamine | 1.0 part |
| 25% aqueous solution of urethane-modified polyester resin | 1.0 part |
| PROXEL XL-2 (trade name, manufactured by Arch Chemicals Japan, Inc.) | 0.05 parts |

-continued

| | |
|---|---|
| Benzotriazole | 0.05 parts |
| ORFIN E1010 (trade name, manufactured by Nissin Chemical Co., Ltd.) | 1.0 part |
| Ion-exchanged water | Balance so that the total amount of the mixture was 100 parts |

<Evaluations>

The aqueous ink composition for inkjet recording obtained as described above was subjected to evaluations described below. The evaluation results are presented in Table 1.

(Ink Stability)

The aqueous ink composition for inkjet recording obtained as described above was sealed in a container made of PET, and the container was stored for 14 days in a constant temperature bath at 60° C. The viscosity and volume average particle diameter were measured before and after the storage, and an evaluation of the ink stability was carried out according to the following evaluation criteria.

The viscosity was measured using an R100-type viscometer (manufactured by Toki Sangyo Co., Ltd.) under the conditions of 25° C. and a speed of cone rotation of 20 to 100 rpm. The volume average particle diameter was measured by a dynamic light scattering method using a Nanotrac particle size distribution analyzer (trade name: UPA-EX150, manufactured by Nikkiso Co., Ltd.).

—Evaluation Criteria—

A: The values of the viscosity and volume average particle diameter after storage were each within the range of the value before storage ±6%.

B: The value of any of the viscosity and volume average particle diameter after storage exceeded the range of the value before storage ±6%.

(Jetting Recoverability)

The aqueous ink composition for inkjet recording obtained as described above was sealed in a container made of PET, and the container was stored for 14 days in a constant temperature bath at 60° C. "KASSAI SHASHIN SHIAGE PRO" manufactured by FUJIFILM Corp. was used as a recording medium, and an inkjet apparatus equipped with a prototype print head with 256 nozzles of 600 dots/25.4 mm was provided as an inkjet recording apparatus. The inkjet apparatus was loaded with the ink composition that had been stored for 14 days in a constant temperature bath at 60° C.

The ink was jetted from the head for 30 minutes, and then, as a maintenance operation, a pressure of 15 kPa was applied thereto for 10 seconds, wiping was performed with clean wipers (trade name: FF-390c, manufactured by Kuraray Co., Ltd.), and then jetting was continued for another 5 minutes. After the 5 minutes, a solid image and a fine line image (both having a size of 5 cm×5 cm) were formed on "KASSAI SHASHIN SHIAGE PRO" manufactured by FUJIFILM Corp. and visually observed and evaluated according to the following evaluation criteria.

—Evaluation Criteria—

A: Image defect due to the occurrence of white deletion or the like was not recognized.

B: Slight image defect due to the occurrence of white deletion or the like was recognized, not causing any practical problem.

C: Significant image defect due to the occurrence of white deletion or the like was recognized, causing a practical problem.

(Light Resistance)

In the same manner as in the evaluation of jetting recoverability, an inkjet apparatus equipped with a prototype print head with 256 nozzles of 600 dots/25.4 mm was provided as an inkjet recording apparatus, and the apparatus was loaded with the obtained aqueous ink composition for inkjet recording. A solid image was formed on "KASSAI SHASHIN SHI-AGE PRO" manufactured by FUJIFILM Corp., and thus a sample for evaluation was obtained. The obtained sample for evaluation was irradiated for 20 days using a xenon weather meter (manufactured by Suga Test Instruments Co., Ltd.) under conditions equivalent to direct outdoor exposure (9.9 klux). Subsequently, for the solid image having an optical density (OD) before irradiation of 1.00, the colorant residual ratio [(density after irradiation/density before irradiation)× 100%] was determined, and thereby light resistance was evaluated according to the following evaluation criteria.

—Evaluation Criteria—

A: The colorant residual ratio was equal to or greater than 80%.

B: The colorant residual ratio was equal to or greater than 50% and less than 80%.

C: The colorant residual ratio was less than 50%.

(Glossiness)

In the same manner as in the evaluation for jetting recoverability, an inkjet apparatus equipped with a prototype print head with 256 nozzles of 600 dots/25.4 mm was provided as an inkjet recording apparatus, and the apparatus was loaded with the obtained aqueous ink composition for inkjet recording. Solid images were formed on "KASSAI SHASHIN SHI-AGE PRO" manufactured by FUJIFILM Corp. at printing duties of 20%, 40%, 60%, 80% and 100%, respectively, and thus samples for evaluation were obtained. After the samples for evaluation were sufficiently dried, the obtained samples were visually observed from various angles, and glossiness was judged. The evaluation results are presented in Table 1.

—Evaluation Criteria—

A: When the light of a fluorescent lamp was projected on the printed area, the reflected light of the fluorescent lamp was clear.

B: When the light of a fluorescent lamp was projected on the printed area, the reflected light of the fluorescent lamp was slightly less clear.

C: When the light of a fluorescent lamp was projected on the printed area, the reflected light of the fluorescent lamp was dull and was not clear.

<Examples 2 to 19>

Aqueous ink compositions for inkjet recording were produced in the same manner as in Example 1, except that the yellow azo pigments indicated in the following Table 1 (hereinafter, may be simply referred to as "pigment") were used as the yellow azo pigment, in place of the exemplified compound (Pig.-1) used in Example 1. The obtained aqueous ink compositions for inkjet recording were evaluated in the same manner as in Example 1. The evaluation results are presented in Table 1.

<Examples 20 to 21>

Aqueous ink compositions for inkjet recording were produced in the same manner as in Example 1, except that the amount of addition of the 25% aqueous solution of urethane-modified polyester resin for the preparation of the aqueous ink composition for inkjet recording of Example 1 was changed to 3 parts or 0.5 parts. The obtained aqueous ink compositions for inkjet recording were evaluated in the same manner as in Example 1. The evaluation results are presented in Table 1.

<Comparative Example 1>

An aqueous ink composition for inkjet recording was produced in the same manner as in Example 1, except that the amount of addition of the 25% aqueous solution of urethane-modified polyester resin for the preparation of the aqueous ink composition for inkjet recording of Example 1 was changed to 0 parts. The obtained aqueous ink composition for inkjet recording was evaluated in the same manner as in Example 1. The evaluation results are presented in Table 1.

<Comparative Example 2>

An aqueous ink composition for inkjet recording was produced in the same manner as in Example 1, except that SUIMEI FAST YELLOW L5G (trade name, manufactured by Sansui Pigment Industry Co., Ltd., C.I. Pigment Yellow 74; hereinafter, may be referred to as "PY-74") was used as the yellow azo pigment, in place of the exemplified compound (Pig.-1) used in the preparation of the aqueous ink composition for inkjet recording of Example 1. The obtained aqueous ink composition for inkjet recording was evaluated in the same manner as in Example 1.

<Comparative Example 3>

An aqueous ink composition for inkjet recording was produced in the same manner as in Example 1, except that PV FAST YELLOW 4GP (trade name, manufactured by Clariant Japan K.K., C.I. Pigment Yellow 155; hereinafter, may be referred to as "PY-155") was used as the yellow azo pigment, in place of the exemplified compound (Pig.-1) used in the preparation of the aqueous ink composition for inkjet recording of Example 1. The obtained aqueous ink composition for inkjet recording was evaluated in the same manner as in Example 1.

<Comparative Example 4>

An aqueous ink composition for inkjet recording was produced in the same manner as in Example 1, except that SUIMEI FAST YELLOW L5G (trade name, manufactured by Sansui Pigment Industry Co., Ltd., C.I. Pigment Yellow 74) was used as the yellow azo pigment, in place of the exemplified compound (Pig.-1) used in the preparation of the aqueous ink composition for inkjet recording of Example 1, and the amount of addition of the 25% aqueous solution of urethane-modified polyester resin was changed to 0.5 parts. The obtained aqueous ink composition for inkjet recording was evaluated in the same manner as in Example 1.

<Comparative Example 5>

An aqueous ink composition for inkjet recording was produced in the same manner as in Example 1, except that TAD3000 (trade name, manufactured by Toyobo Co., Ltd., acryl-modified polyester resin: polymer component 34%) was used in place of the 25% aqueous solution of urethane-modified polyester resin used in the preparation of the aqueous ink composition for inkjet recording of Example 1, and the amount of addition thereof was adjusted to 0.75 parts. The obtained aqueous ink composition for inkjet recording was evaluated in the same manner as in Example 1.

<Comparative Example 6>

An aqueous ink composition for inkjet recording was produced in the same manner as in Example 1, except that VON-DIC 1610NS (trade name, manufactured by Dainippon Ink and Chemicals, Inc., urethane-modified polyether resin: polymer component 25%) was used in place of the 25% aqueous solution of urethane-modified polyester resin used in the preparation of the aqueous ink composition for inkjet recording of Example 1. The obtained aqueous ink composition for inkjet recording was evaluated in the same manner as in Example 1.

TABLE 1

| | Pigment | | Water-soluble resin | | Ink stability | Jetting recoverability | Light resistance | Glossiness |
|---|---|---|---|---|---|---|---|---|
| | Type | Volume average particle diameter | Type | Content (% with respect to pigment) | | | | |
| Example 1 | Pig.-1 | A | Urethane-modified polyester resin | 10 | A | A | A | A |
| Example 2 | Pig.-2 | A | Urethane-modified polyester resin | 20 | A | A | A | A |
| Example 3 | Pig.-3 | A | Urethane-modified polyester resin | 20 | A | A | A | A |
| Example 4 | Pig.-4 | B | Urethane-modified polyester resin | 10 | A | A | A | A |
| Example 5 | Pig.-6 | A | Urethane-modified polyester resin | 20 | A | A | A | A |
| Example 6 | Pig.-9 | A | Urethane-modified polyester resin | 10 | A | A | A | A |
| Example 7 | Pig.-10 | A | Urethane-modified polyester resin | 10 | A | A | A | A |
| Example 8 | Pig.-11 | A | Urethane-modified polyester resin | 30 | A | A | A | A |
| Example 9 | Pig.-12 | B | Urethane-modified polyester resin | 10 | A | A | A | A |
| Example 10 | Pig.-15 | A | Urethane-modified polyester resin | 10 | A | A | A | A |
| Example 11 | Pig.-18 | A | Urethane-modified polyester resin | 10 | A | A | A | A |
| Example 12 | Pig.-19 | A | Urethane-modified polyester resin | 20 | A | A | A | A |
| Example 13 | Pig.-21 | A | Urethane-modified polyester resin | 10 | A | A | A | A |
| Example 14 | Pig.-24 | B | Urethane-modified polyester resin | 20 | A | A | A | A |
| Example 15 | Pig.-25 | A | Urethane-modified polyester resin | 10 | A | A | A | A |
| Example 16 | Pig.-34 | B | Urethane-modified polyester resin | 20 | A | A | A | A |
| Example 17 | Pig.-35 | B | Urethane-modified polyester resin | 20 | A | A | A | A |
| Example 18 | Pig.-36 | A | Urethane-modified polyester resin | 10 | A | A | A | A |
| Example 19 | Pig.-37 | A | Urethane-modified polyester resin | 10 | A | A | A | A |
| Example 20 | Pig.-1 | A | Urethane-modified polyester resin | 30 | A | A | A | A |
| Example 21 | Pig.-1 | A | Urethane-modified polyester resin | 5 | A | A | A | A |
| Comparative Example 1 | Pig.-1 | A | — | — | B | C | A | C |
| Comparative Example 2 | PY-74 | C | Urethane-modified polyester resin | 10 | A | C | C | A |
| Comparative Example 3 | PY-155 | B | Urethane-modified polyester resin | 10 | A | C | B | A |
| Comparative Example 4 | PY-74 | C | Urethane-modified polyester resin | 5 | B | C | C | B |
| Comparative Example 5 | Pig.-1 | A | Acryl-modified polyester resin | 10 | B | B | A | B |
| Comparative Example 6 | Pig.-1 | A | Urethane-modified polyether resin | 10 | B | B | A | B |

It can be seen from Table 1 that the aqueous ink composition for inkjet recording of the invention is excellent in ink stability and jetting recoverability. It can be also seen that the images formed therefrom are excellent in light resistance and glossiness.

All publications, patent applications, and technical standards mentioned in this specification are herein incorporated by reference to the same extent as if each individual publication, patent application, or technical standard was specifically and individually indicated to be incorporated by reference.

What is claimed is:

1. An aqueous ink composition for inkjet recording, comprising: a coloring material containing at least one selected from the group consisting of azo pigments represented by the following formula (1) and tautomers thereof, and salts and hydrates thereof; a dispersant; and a urethane-modified polyester resin, wherein the urethane-modified polyester resin contains a structural unit derived from a polyester polyol obtained from an alkanediol and a polybasic acid or an acid anhydride thereof, and a structural unit derived from an organic polyisocyanate:

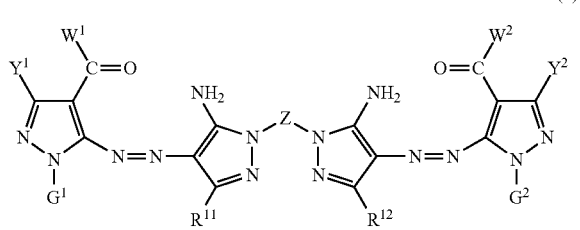

(1)

wherein Z represents a divalent group derived from a 5- to 8-membered nitrogen-containing heterocycle; $Y^1$, $Y^2$, $R^{11}$ and $R^{12}$ each independently represent a hydrogen atom or a substituent; $G^1$ and $G^2$ each independently represent a hydrogen atom, an alkyl group, an aralkyl group, an alkenyl group, an alkynyl group, an aryl group or a heterocyclic group; and $W^1$ and $W^2$ each independently represent an alkoxy group, an amino group, an alkyl group or an aryl group.

2. The aqueous ink composition for inkjet recording of claim 1, wherein $W^1$ and $W^2$ in formula (1) each independently represent an alkoxy group having 3 or fewer carbon atoms in total, an amino group, or an alkylamino group having 3 or fewer carbon atoms in total.

3. The aqueous ink composition for inkjet recording of claim 1, wherein $G^1$ and $G^2$ in formula (1) each independently represent an alkyl group having 3 or fewer carbon atoms in total.

4. The aqueous ink composition for inkjet recording of claim 1, wherein Z in formula (1) represents a divalent group derived from a 6-membered nitrogen-containing heterocycle.

5. The aqueous ink composition for inkjet recording of claim 1, wherein the alkanediol includes 3-methylpentanediol, the polybasic acid includes adipic acid, and the organic polyisocyanate includes isophorone diisocyanate.

6. The aqueous ink composition for inkjet recording of claim 1, wherein the mass ratio of the urethane-modified polyester resin to the coloring material (urethane-modified polyester resin/coloring material) is 0.05 or greater.

7. The aqueous ink composition for inkjet recording of claim 1, comprising the coloring material in an amount of 0.3 to 8% by mass.

8. The aqueous ink composition for inkjet recording of claim 1, wherein the volume average particle diameter of the coloring material is 150 nm or less.

9. The aqueous ink composition for inkjet recording of claim 1, wherein the dispersant is a copolymer containing a hydrophilic structural unit and a hydrophobic structural unit.

10. A method for forming an inkjet image, comprising jetting the aqueous ink composition for inkjet recording of claim 1, onto a recording medium by an inkjet method.

* * * * *